United States Patent [19]

Ogasawara et al.

[11] Patent Number: 5,619,380
[45] Date of Patent: Apr. 8, 1997

[54] OBJECTIVE OPTICAL SYSTEM FOR ENDOSCOPES

[75] Inventors: Syuichiro Ogasawara; Takao Mori, both of Tokyo-to; Akira Yokota, Kanagawa-ken, all of Japan

[73] Assignee: Olympus Optical Co. Ltd., Tokyo-to, Japan

[21] Appl. No.: 430,254

[22] Filed: Apr. 28, 1995

Related U.S. Application Data

[63] Continuation of Ser. No. 65,784, May 24, 1993, abandoned.

[30] Foreign Application Priority Data

May 25, 1992 [JP] Japan .................................. 4-156218
Aug. 14, 1992 [JP] Japan .................................. 4-237592

[51] Int. Cl.$^6$ .......................... G02B 21/02; G02B 3/02; G02B 9/00
[52] U.S. Cl. ..................... 359/661; 359/717; 359/740; 359/793
[58] Field of Search ..................... 359/717, 708, 359/691, 739, 740, 793, 661, 656

[56] References Cited

U.S. PATENT DOCUMENTS

| 4,354,734 | 10/1982 | Nakahashi | 359/794 |
| 4,858,002 | 8/1989 | Zobel | 359/661 |
| 5,223,982 | 6/1993 | Suzuki et al. | 359/708 |

FOREIGN PATENT DOCUMENTS

| 56-25709 | 3/1981 | Japan . |
| 63-84109 | 6/1988 | Japan . |
| 2-77712 | 3/1990 | Japan . |

*Primary Examiner*—Georgia Y. Epps
*Assistant Examiner*—Evelyn A. Lester
*Attorney, Agent, or Firm*—Cushman Darby & Cushman IP Group of Pillsbury Madison & Sutro LLP

[57] ABSTRACT

An objective optical system for endoscopes consisting, in order from the object side, of a front lens unit having a negative refractive power, and a rear lens unit which is composed of a single lens component and has a positive refractive power. This objective optical system comprises a small number of lens components, has favorably corrected aberrations and satisfies the following condition:

$$CJ < 8IH$$

20 Claims, 21 Drawing Sheets

SPHERICAL ABERRATION    ASTIGMATISM    DISTORTION    COMA

SPHERICAL ABERRATION

ASTIGMATISM

DISTORTION

COMA

SPHERICAL ABERRATION

ASTIGMATISM

DISTORTION

COMA

SPHERICAL ABERRATION

ASTIGMATISM

DISTORTION

COMA

SPHERICAL ABERRATION

ASTIGMATISM

DISTORTION

COMA

FIG. 27A　　FIG. 27B　　FIG. 27C　　FIG. 27D
SPHERICAL　ASTIGMATISM　DISTORTION　COMA
ABERRATION
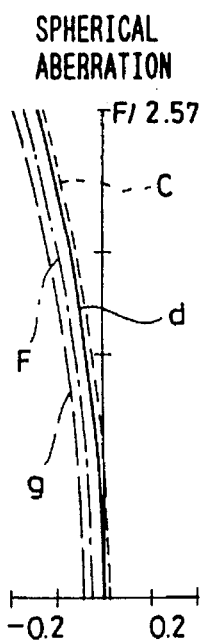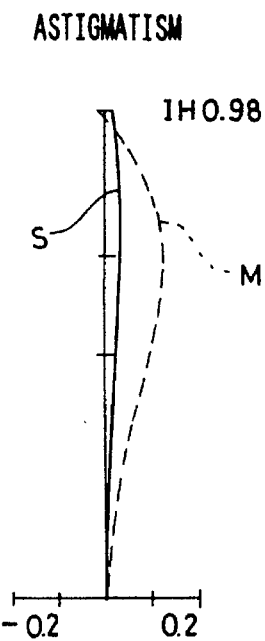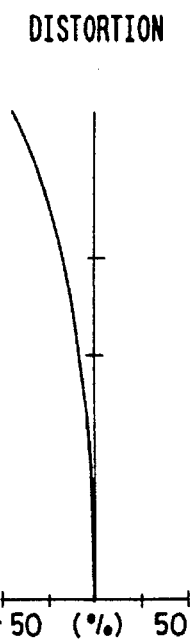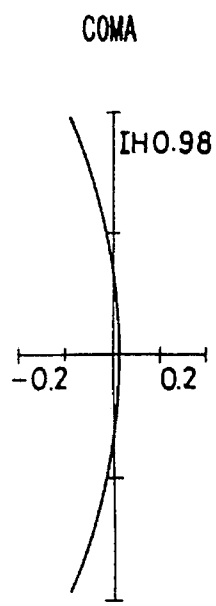
FIG. 28A　　FIG. 28B　　FIG. 28C　　FIG. 28D
SPHERICAL　ASTIGMATISM　DISTORTION　COMA
ABERRATION
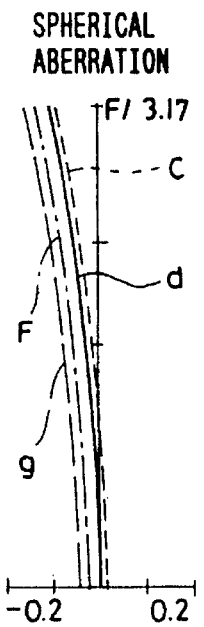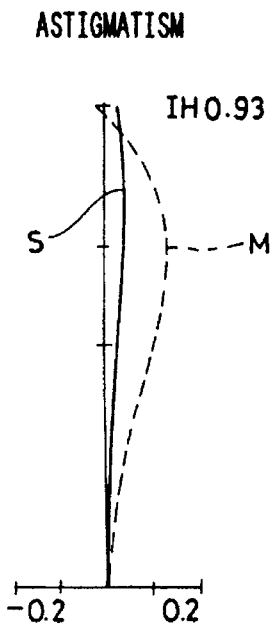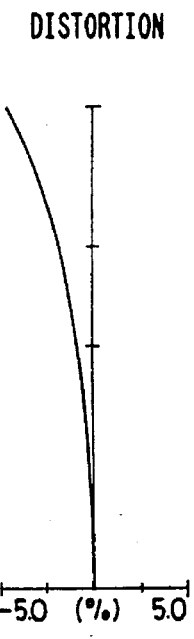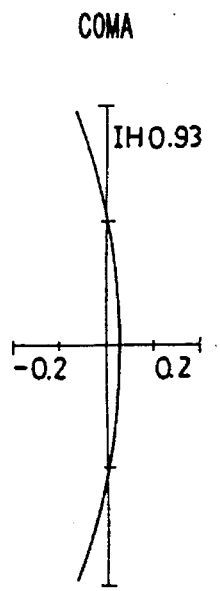

SPHERICAL ABERRATION

ASTIGMATISM

DISTORTION

COMA

SPHERICAL ABERRATION

ASTIGMATISM

DISTORTION

COMA

FIG. 31A
SPHERICAL ABERRATION
FIG. 31B
ASTIGMATISM
FIG. 31C
DISTORTION
FIG. 31D
COMA
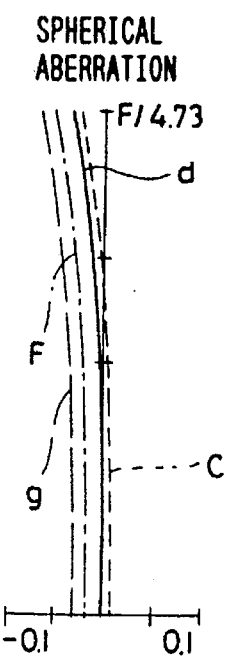
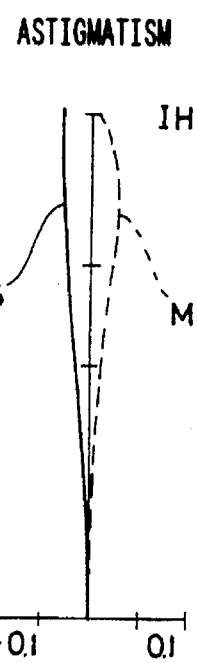
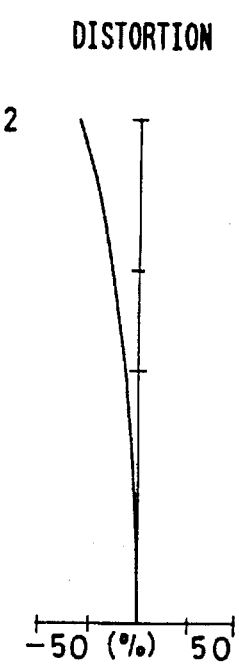
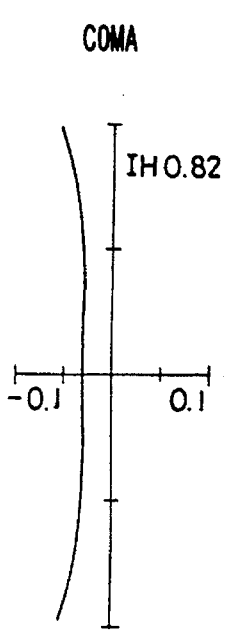
FIG. 32A
SPHERICAL ABERRATION
FIG. 32B
ASTIGMATISM
FIG. 32C
DISTORTION
FIG. 32D
COMA
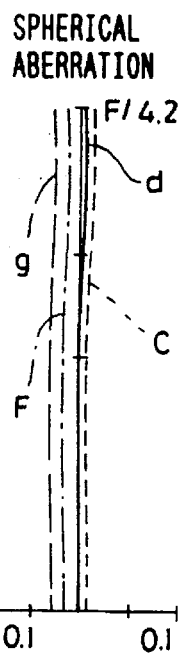
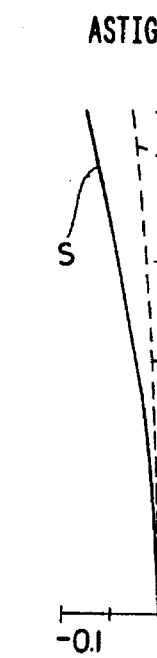
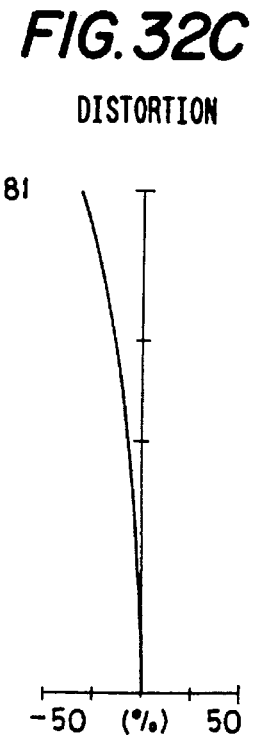
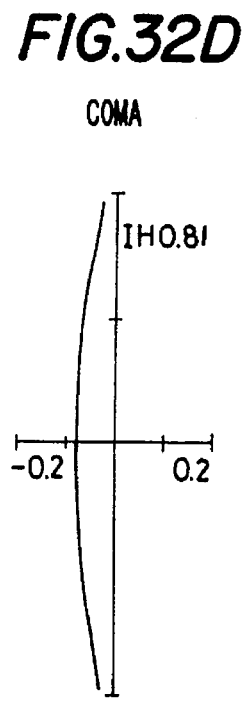

SPHERICAL ABERRATION

ASTIGMATISM

DISTORTION

COMA

SPHERICAL ABERRATION

ASTIGMATISM

DISTORTION

COMA

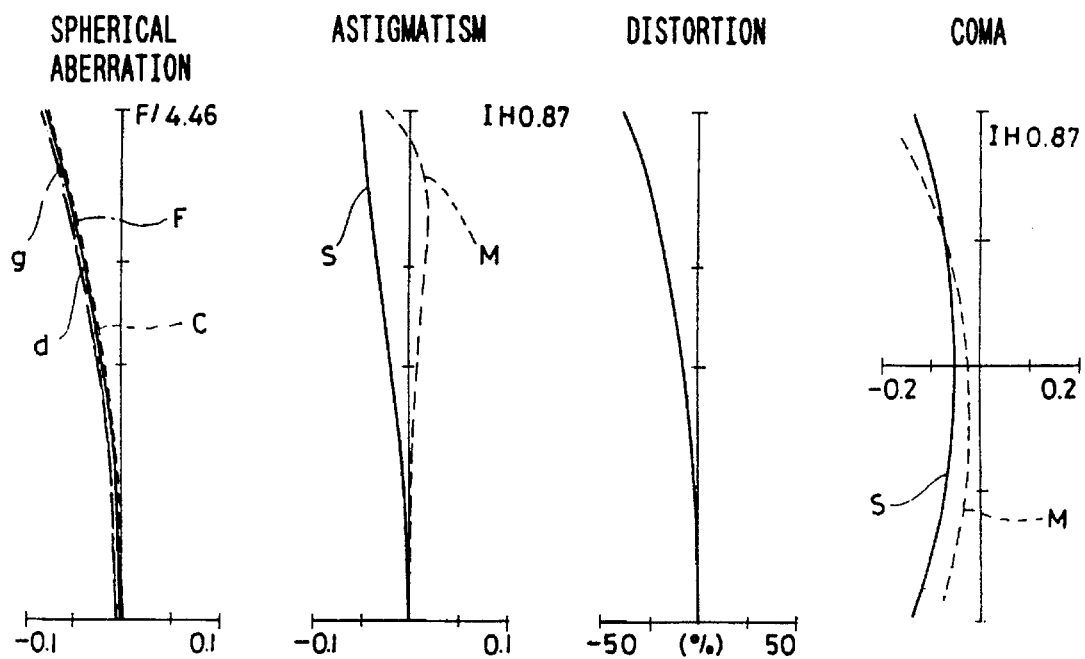
FIG.35A SPHERICAL ABERRATION
FIG.35B ASTIGMATISM
FIG.35C DISTORTION
FIG.35D COMA
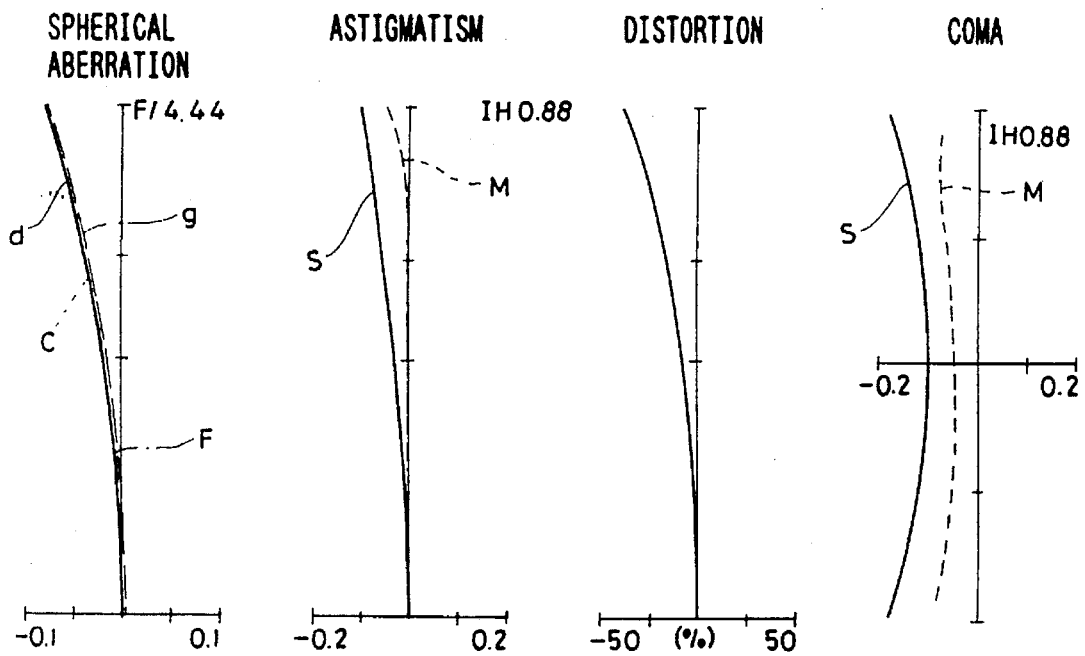
FIG.36A SPHERICAL ABERRATION
FIG.36B ASTIGMATISM
FIG.36C DISTORTION
FIG.36D COMA

SPHERICAL ABERRATION

ASTIGMATISM

DISTORTION

COMA

SPHERICAL ABERRATION

ASTIGMATISM

DISTORTION

COMA

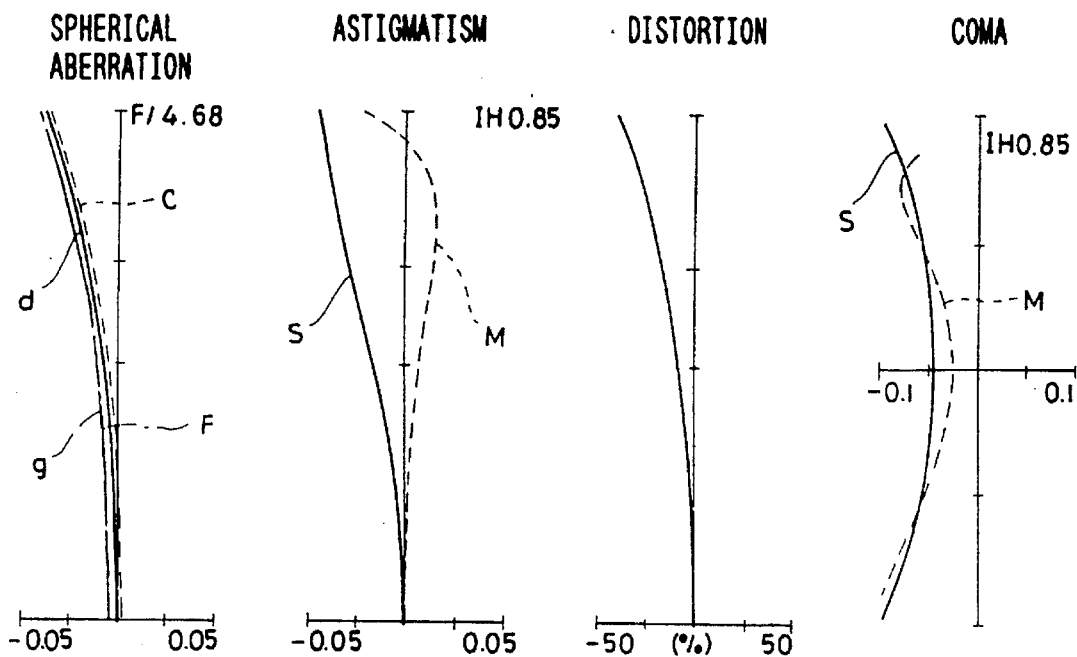
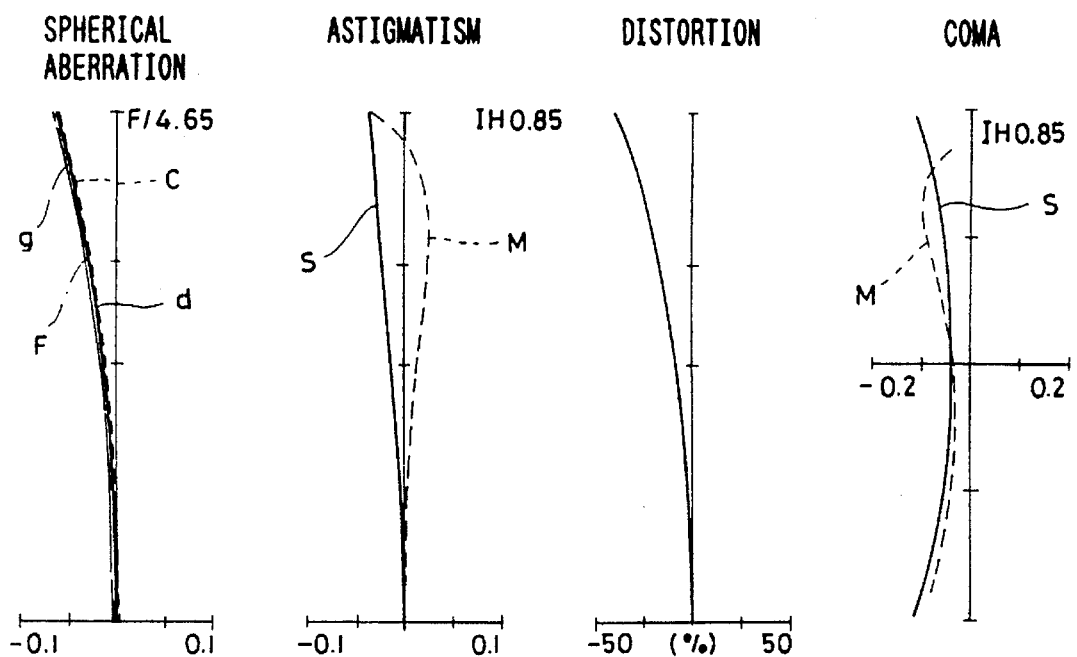

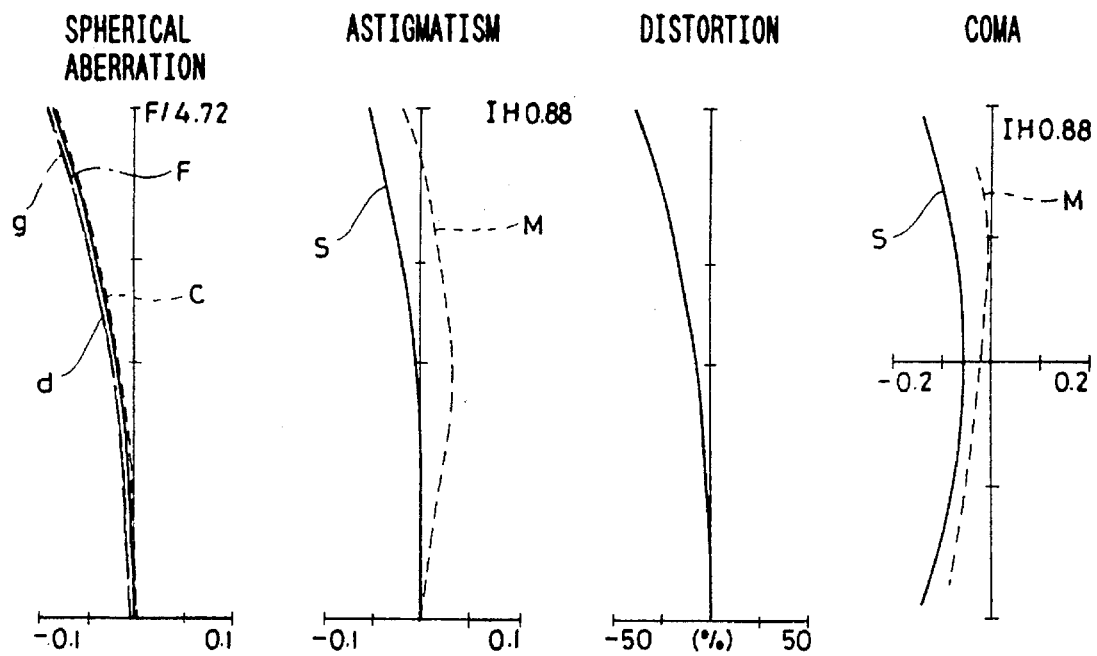
FIG. 41A SPHERICAL ABERRATION
FIG. 41B ASTIGMATISM
FIG. 41C DISTORTION
FIG. 41D COMA
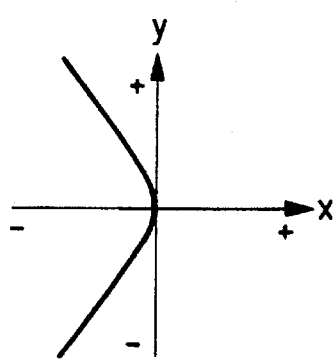
FIG. 42

OBJECTIVE OPTICAL SYSTEM FOR ENDOSCOPES

This is a continuation of application No. 08/065,784, filed on May 24, 1993, which was abandoned upon the filing hereof.

OBJECTIVE OPTICAL SYSTEM FOR ENDOSCOPES

1. Field of the Invention:

The present invention relates to an objective optical system for endoscopes which are equipped with optical fiber bundles or image pickup devices using relatively small numbers of picture elements and having small outside diameters.

2. Description of the Prior Art:

Japanese Patent Kokai Publication No. Hei 2-77,712 discloses an objective optical system for endoscopes suited for use with endoscopes which are equipped with image pickup devices having relatively small numbers of picture elements and endoscopes which are equipped with optical fiber bundles having relatively small numbers of picture elements such as medical endoscopes to be employed for inspections of bronchi and bile ducts as well as industrial endoscopes having small outside diameters. This objective optical system for endoscopes consists of a negative lens component and a positive lens component as illustrated in FIG. 1. When such an objective optical system is configured so as to have a wide field angle, the negative lens component used as a first lens component has an outside diameter larger than an image height. For this reason, it is impossible to configure the objective optical system so as to have a wide field angle and to be compact, and the above-mentioned conventional example is therefore practically unusable as an objective optical system for endoscopes. Further, when the objective optical system is configured so as to have a wide field angle, coma is unbalanced.

Furthermore, since the above-mentioned objective optical system for endoscopes provides nearly no freedom for correcting longitudinal chromatic aberration and lateral chromatic aberration, the objective optical system uses glass materials having large Abbe's numbers so that the lens components produce chromatic aberration in amounts as small as possible, whereby the objective optical system produces chromatic aberration in an amount within a size of several picture elements of an image guide optical fiber bundle or a solid-state image pickup device and the optical performance is sufficiently usable in practice.

On the other hand, each of retrofocus type objective optical systems which are used mainly as objective optical systems for endoscopes comprises three or more lens Components. Further, the retrofocus type objective optical system for endoscopes uses a cemented lens component for correcting chromatic aberration. Japanese Utility Model Kokai Publication No. Sho 63-84,109, for example, discloses a retrofocus type objective optical system which has a simple composition. This objective optical system consists, in order from the object side, of a meniscus lens component having a convex surface on the object side, an aperture stop and a lens component having a positive refractive power.

When a focal length of the meniscus lens component disposed on the object side in the objective optical system and having the convex surface on the object side is represented by $f_1$ and a focal length of the objective optical system as a whole is designated by f, the meniscus lens component has a very weak refractive power which satisfies relationship of $|f_1|>10f$ so that asymmetrical aberrations are not produced. However, this objective optical system is designed for use with cameras and not for use with endoscopes. Further, the above-mentioned Japanese Utility Model Kokai Publication No. Sho 63-84,109 makes no reference to any means for widening a field angle or correction of curvature of field which is inevitably demanded when the objective optical system is to be used as an objective optical system for endoscopes.

Moreover, the applicant submitted a patent application, as Japanese Patent Application No. Hei 4-156,218, for an objective optical system for medical endoscopes which are to be used for inspecting bronchi and bile ducts, and equipped with image pickup devices using relatively small numbers of picture elements as well as industrial endoscopes which have small diameters and uses image pickup devices having relatively small numbers of picture elements. This objective optical system is compact, has favorably corrected curvature of field and comprises a small number of lens components. This objective optical system consists of a negative lens component and a positive lens component as illustrated in FIG. 2. Since the objective optical system which has the composition illustrated in FIG. 2 has no factor for correcting longitudinal chromatic aberration and lateral chromatic aberration, the optical system uses glass materials having large Abbe's numbers so that the lens components produce chromatic aberration in an amount as small as possible or chromatic aberration is reduced in an amount thereof within a size of several picture elements of an image guide or a solid-state image pickup device for maintaining optical performance of the optical system sufficient for practical use.

An objective optical system having a relatively large amount of chromatic aberration generally allows colors to be smudged in particular on marginal portions of images. Further, an objective optical system having remarkable chromatic aberration allows image qualities to be degraded due to smudging of colors over the entire ranges of images and often consitutes a hindrance to diagnosis when the optical system is used as an objective optical system for endoscopes.

In the recent years where image guides and solid-state image pickup devices having high resolution are manufactured owing to the progresses made in manufacturing technologies therefor, it is necessary to configure objective optical systems for endoscopes so as to have high resolution by correcting lateral chromatic aberration and longitudinal chromatic aberration sufficiently favorably. However, the objective optical system mentioned above cannot correct lateral chromatic aberration and longitudinal chromatic aberration sufficiently favorably and the composition of the objective optical system which comprises no factor for correcting the chromatic aberrations does not permit enhancing resolution by correcting these chromatic aberrations sufficiently favorably.

SUMMARY OF THE INVENTION

A primary object of the present invention is to provide an objective optical system for endoscopes which comprises a small number of lens components and has favorably corrected curvature of field.

Another object of the present invention is to provide an objective optical system for endoscopes which comprises a small number of lens components, and has favorably corrected lateral chromatic aberration and longitudinal chromatic aberration.

The objective optical system for endoscopes according to the present invention has a composition exemplified in FIG. 2, or comprises a first lens component $L_1$ which is disposed on the object side of an aperture stop S and composed of a single negative lens component, and a second lens component $L_2$ which is disposed on the image side of the aperture stop S and composed of a single positive lens component; and is configured so as to satisfy the following condition (A):

$$CJ<8IH \quad (A)$$

wherein the reference symbol CJ represents a distance as measured from a first surface of the objective optical system to a paraxial image surface thereof and the reference symbol IH designates a maximum image height. Therefore, CJ is obtained from the sum of the distance from the lens system to the paraxial image surface (BFL) and the thickness of the lens system ($\Sigma d$). The position of the paraxial image surface can be calculated by a commonly used ray tracing. The paraxial amount can be obtained by a conventionally known paraxial equation.

It is more desirable that the objective optical system for endoscopes according to the present invention satisfies CJ<6IH in place of the condition (A) mentioned above.

The objective optical system for endoscopes according to the present invention having the composition described above can hardly correct aberrations sufficiently favorably for image pickup devices having large numbers of picture elements since the objective optical system uses a small number of lens surfaces, a small number of airspaces reserved between the lens surfaces, a small number of glass materials, and has low freedom in selection of parameters for correcting aberrations. However, so far as amounts of aberrations are limited within a size of two or three picture elements of an optical fiber bundle or within a size of several picture elements of a CCD in certain readout methods, the objective optical system according to the present invention can possibly have optical performance sufficient for practical use when demanded resolution is on the order of 30 lines/mm.

According to the present invention, the negative lens component is disposed on the object side of the aperture stop S and the positive lens component is disposed on the image side of the aperture stop S as described above so as to configure the objective optical system compact. The positive lens component will have an enlarged outside diameter in a case where the aperture stop is disposed on the object side, whereas the objective optical system will have too long a back focal length in another case where the aperture stop is disposed on the image side. It is therefore impossible to configure the objective optical system compact in either case. For configuring the objective optical system compact, it is desirable to satisfy the following condition (B):

$$D_2<2f \quad (B)$$

wherein the reference symbol $D_2$ represents a distance as measured from the first lens component $L_1$ to the aperture stop and the reference symbol f designates a focal length of the objective optical system as a whole.

In the next place, it is desirable for maintaining curvature of field at a low level that the first and the second lens components satisfy the following condition (1):

$$0.3<|f_2/f_1|<2 \quad (1)$$

wherein the reference symbols $f_1$ and $f_2$ represent focal lengths of the first lens component $L_1$ and the second lens component $L_2$ respectively.

The Petzval's sum which is used for judging a degree of correction of curvature of field is a quotient which is obtained by dividing a power of a lens surface by a difference in refractive index between a medium located on the object side of the lens surface and another medium located on the image side of the lens surface. Since a front lens unit (the first lens component) disposed on the object side of the aperture stop has the negative refractive power and a rear lens unit (the second lens component) disposed on the image side of the aperture stop has the positive refractive power in the objective optical system according to the present invention, the objective optical system is configured so as to correct curvature of field favorably by balancing the focal lengths $f_1$ and $f_2$ of the first lens component $L_1$ and the second lens component $L_2$ so as to reduce a Petzval's sum.

If $|f_2/f_1|$ is smaller than 0.3 in the condition (1), the image surface will be inclined toward the object side at high image heights. If $|f_2/f_1|$ is larger than 2, in contrast, the image surface will be inclined in the direction opposite to that toward the object side at the high image heights.

Further, it is desirable for favorably correcting coma and astigmatism that the second lens component $L_2$ satisfies the following condition (2):

$$|R_1|>|R_2| \quad (2)$$

wherein the reference symbols $R_1$ and $R_2$ represent radii of curvature on an object side surface and an image side surface respectively of the second lens component $L_2$.

It is general that aberrations are produced remarkably when a strong refractive power is imparted to a lens surface which refracts a principal ray at a large angle. For this reason, it is desirable that all lens surfaces are nearly concentric with regard to an aperture stop. In the composition of the objective optical system for endoscopes according to the present invention, it is desirable that the convex surface $R_2$ disposed on the image side of the second lens component $L_2$ is configured so as to satisfy the above-mentioned condition (2) and that a strong refractive power is imparted to this surface. If $|R_1|$ is smaller than or equal to $|R_2|$, offaxial rays, especially upper marginal rays, will be refracted abruptly by the surface $R_1$, whereby coma and astigmatism will be undercorrected.

Further, for the objective optical system for endoscopes according to the present invention in which each of the lens components is composed of a single lens element and no cemented lens component is used for correcting chromatic aberration, it is desirable to satisfy the following conditions (3) and (4) for favorably correcting chromatic aberration in the objective optical system:

$$\nu_1>40 \quad (3)$$

$$\nu_2>40 \quad (4)$$

wherein the reference symbols $\nu_1$ and $\nu_2$ represent Abbe's numbers of the first lens component $L_1$ and the second lens component $L_2$ respectively.

If $\nu_1$ does not satisfy the condition (3), lateral chromatic aberration will be overcorrected. If $\nu_2$ does not satisfy the condition (4), both lateral chromatic aberration and longitudinal chromatic aberration will be undercorrected.

In order to correct the chromatic aberrations (lateral chromatic aberration and longitudinal chromatic aberration)

more favorably in the objective optical system according to the present invention, it is necessary to select a composition exemplified in FIG. 14. In this case, the objective optical system for endoscopes according to the present invention consists, in order from the object side, of a front diverging lens unit having a concave surface on the image side (the first lens component), an aperture stop and a rear converging lens unit (the second lens component) which is configured as a cemented lens component consisting of a diverging lens element having a concave surface on the image side and a biconvex converging lens element, and an Abbe's number $v_{2d}$ of the diverging lens element and an Abbe's number $v_{3d}$ of the converging lens element disposed in the rear lens unit are set in relationship expressed by the following condition (5):

$$v_{2d} < v_{3d} \tag{5}$$

Aberrations are produced remarkably when a strong refractive power is imparted to a lens surface which refracts the principal ray at a large angle as described above. For preventing production of such remarkable aberrations, it is desirable that all lens surfaces are disposed nearly concentrically with regard to an aperture stop.

When the above-described composition is selected for the objective optical system for endoscopes according to the present invention, it is desirable to strengthen a refractive power of the converging lens element of the rear lens unit. If this lens surface has a radius of curvature which is shorter than that on the object side surface of the diverging lens element disposed in the rear lens unit, or if $|R_1|$ is smaller than or equal to $|R_2|$, offaxial rays, especially upper marginal rays, which have passed through the aperture stop will produce remarkable coma and astigmatism on the object side surface of the diverging lens element disposed in the rear lens unit, and these aberrations will be undercorrected. The reference symbols $R_1$ and $R_2$ represent radii of curvature on the object side surface and the image side surface respectively of the rear lens unit (the second lens component), i.e., radii of curvature on the object side surface of the diverging lens element and the image side surface of the converging lens element of the rear lens unit.

Further, the objective optical system for endoscopes according to the present invention is configured so as to be compact by disposing the front diverging lens unit and the rear converging lens unit close to each other on both the sides of the aperture stop. As a result, rays which are to be imaged on marginal portions of a visual field are incident at large angles on the object side surface of the rear converging lens unit, whereby remarkable lateral chromatic aberration is produced by this surface. Furthermore, since the image side surface of the rear converging lens unit has the strong positive refractive power, this surface produces remarkable longitudinal chromatic aberration. In order to correct these lateral chromatic aberration and longitudinal chromatic aberration, a center of curvature of the cemented surface of the rear lens unit is located on the side opposite to the aperture stop, the Abbe's number $v_{2d}$ of the diverging lens element and the Abbe's number $v_{3d}$ of the converging lens element of the rear lens unit are selected so as to satisfy the above-mentioned relationship.

If $v_{2d}$ is larger than $v_{3d}$ contrary to the relationship between the Abbe's numbers defined above, longitudinal chromatic aberration can be corrected by locating the center of curvature of the cemented lens component on the side of the aperture stop, but lateral chromatic aberration cannot be corrected sufficiently since it is impossible to allow the offaxial rays to be incident at large angles on the cemented surface. If curvature of the cemented surface is enhanced so that it has a strengthened function to correct lateral chromatic aberration, the converging lens element used as the second lens element in the rear lens unit will be too thin to be manufactured in practice.

When a center of curvature on a cemented surface of a cemented lens component is located on a side opposite to an aperture stop as in the objective lens system according to the present invention, offaxial rays having larger heights are incident on the cemented surface at larger angles, whereby it is possible to favorably correct not only longitudinal chromatic aberration but also lateral chromatic aberration and an advantage for widening a field angle of the optical system can be obtained.

Further, since the diverging lens element disposed in the cemented lens component has a higher effect for correcting chromatic aberration as it has a higher dispersive power, it is desirable that the Abbe's number $v_{2d}$ of the diverging lens element satisfies the following condition (6):

$$v_{2d} < 35 \tag{6}$$

It is desirable for correcting lateral chromatic aberration and longitudinal chromatic aberration more favorably to reduce a dispersive power of the front diverging lens unit or select the Abbe's number $v_{1d}$ of the front diverging lens unit so as to satisfy the following condition (7):

$$v_{1d} > 40 \tag{7}$$

When the front diverging lens unit satisfies the above-mentioned condition (7), it is possible to favorably correct chromatic aberration, whereby curvature on the cemented surface of the cemented lens component can be lowered and the converging lens element (the biconvex lens element) disposed as the second lens element can be manufactured more easily in practice.

Then, it is desirable for more favorably correction of spherical aberration, coma etc. to use, as at least one lens surface disposed in the objective optical system for endoscopes according to the present invention, an aspherical surface which satisfies the following condition (8):

$$E_i'(n_{i-1} - n_i) > 0 \tag{8}$$

wherein the reference symbol $E_i'$ represents an aspherical surface coefficient of the fourth order of the aspherical surface, and the reference symbols $n_{i-1}$ and $n_i$ designate refractive indices of media located on the object side and the image side respectively of the aspherical surface.

Now, description will be made of an expression of aspherical surfaces adopted for the present invention. In embodiments of the present invention which are to be described later, aspherical surfaces are expressed by using the following formula (a):

$$x = \frac{y^2/r_i}{1 + \sqrt{1 - P_i(y/r_i)^2}} + B_i y^2 + E_i y^4 + F_i y^6 + G_i y^8 + \ldots \tag{a}$$

wherein the reference symbols x and y represent coordinates values on a system of coordinates on which an optical axis is taken as the x axis regarding the direction toward an image as positive, a direction perpendicular to the optical axis is taken as the y axis, and an intersection between the aspherical surface and the optical axis is taken as an origin. Further, the reference symbol $r_i$ represents a radius of curvature as measured at a vertex of a quadratically curved surface, the reference symbol $P_i$ designates a conical constant, and the reference symbols $B_i$, $E_i$, $F_i$, $G_i$, ... denote the aspherical surface coefficient of the second, fourth, sixth, eighth, ... orders respectively.

The above-mentioned formula (a) has high freedom and is suited for expressing axially symmetrical surfaces, but is unsuited for description according to the aberration theory. For describing a function of the aspherical surface to be used in the objective optical system for endoscopes according to the present invention, it is preferable to express a shape of the aspherical surface by using the following formula (b):

$$x = \frac{y^2/r_i'}{1 + \sqrt{1 - (y/r_i')^2}} + E_i' y^4 + F_i' y^6 + G_i' y^8 + \ldots \quad \text{(b)}$$

wherein the reference symbol $r_i'$ represents a radius of curvature on a reference sphere of the aspherical surface (a spherical surface which is in contact with the aspherical surface at a vertex thereof), and the reference symbols $E_i'$, $F_i'$, $G_i'$, ... designate aspherical surface coefficients of the fourth, sixth, eighth, ... orders respectively which are obtained by transforming the formula (a) into the formula (b). The formula (a) can be transformed into the formula (b) by using Taylor expansion. Formulae for transforming $r_i'$, $E_i'$, ... $I_i'$ are shown below (these formulae will hereinafter be referred collectively as formula (c)):

$r_i' = r_i/(1+2B_i r_i)$
$E_i' = 0.125 \{P_i - (1+2B_i r_i)^3\}/r_i^3 + E_i$
$F_i' = 0.0625 \{P_i^2 - (1+2B_i r_i)^5\}/r_i^5 + F_i$
$G_i' = 0.0390625 \{P_i^3 - (1+2B_i r_i)^7\}/r_i^7 + G_i$
$H_i' = 0.02734375 \{P_i^4 - (1+2B_i r_i)^9\}/r_i^9 + H_i$
$I_i' = 0.02050782 \{P_i^5 - (1+2B_i r_i)^{11}\}/r_i^{11} + I_i$

In the formula (c) shown above, the first term in the right side of the formula expressing each of the aspherical surface coefficients $E_i'$, $F_i'$, ... has been obtained by performing Taylor expansion of the term expressing the quadratically curved surface. Since the formulae obtained by Taylor expansion express infinite series, the formulae comprising only finite orders provide approximations. However, formulae comprising the coefficients down to the twelfth order can ordinarily provide good approximations and the formula (c) contains calculation formulae using the coefficients down to the twelfth order only. When $P_i$ is equal to 1 and $B_i$ is equal to 0 in the formula (a), it is unnecessary to transform the above-mentioned aspherical surface coefficients since $r_i'$ is equal to $r_i$, $E_i'$ is equal to $E_i$, $F_i'$ is equal to $F_i$ and $G_i'$ is equal to $G_i$, ...

The above-mentioned condition (8) is required for favorably correcting spherical aberration, coma, etc. by using the aspherical surface. The aspherical surface is effective for favorably correcting aberrations other than chromatic aberration and curvature of field. Since the objective optical system for endoscopes according to the present invention consists of the small number of lens components and allows aberrations to remain therein, the optical system is configured so as to cancel the residual aberrations with those produced by using the aspherical surface. In order to cancel the residual aberrations by using the aspherical surface, it is necessary to know aberrations which are to remain in the objective optical system.

An optical system which has a composition like that of the objective optical system for endoscopes according to the present invention generally allows negative spherical aberration and negative coma (inner coma) to remain therein. For correcting these residual aberrations by using the aspherical surface, it is sufficient to configure the aspherical surface so as to produce positive spherical aberration and positive coma.

Relationship between the aspherical surface coefficient of the fourth order $E_i'$ and the coefficients of the third order of spherical aberration, coma and astigmatism which are produced by using the aspherical surface in place of a spherical surface is expressed by the formulae (d), (e) and (f) shown below:

$$\Delta SA_i = 8 h_i^4 \cdot E_i' (n_{i-1} - n_i) \quad \text{(d)}$$

$$\Delta CM_i = 8 h_i^3 \cdot h_{ci} \cdot E_i' (n_{i-1} - n_i) \quad \text{(e)}$$

$$\Delta AS_i = 8 h_i^2 \cdot h_{ci}^2 \cdot E_i' (n_{i-1} - n_i) \quad \text{(f)}$$

wherein the reference symbols $\Delta SA_i$, $\Delta CM_i$ and $\Delta AS_i$ represent the coefficients of the third order of spherical aberration, coma and astigmatism respectively produced due to the coefficient of the fourth order of the aspherical surface, the reference symbol $h_i$ designates a height of a paraxial marginal ray on the aspherical surface, and the reference symbol $h_{ci}$ denotes a height of a paraxial principal ray on the aspherical surface.

As is understood from the formulae (d), (e) and (f), influences on the different types of aberrations are different dependently on locations of the aspherical surface since $h_i$ and $h_{ci}$ have different powers. In the objective optical system for endoscopes according to the present invention, the paraxial marginal ray is always on the same side relative to the optical axis and $h_i$ is always positive. On the other hand, since the paraxial principal ray crosses the optical axis at a center of the aperture stop, $h_{ci}$ has signs which are reverse to each other before and after the aperture stop, i.e., $h_{ci}$ is negative before the aperture stop and positive after the apertures top. Signs of $\Delta SA_i$, $\Delta CM_i$ and $\Delta AS_i$ which are calculated on the basis of the signs of $h_{ci}$ are the signs of the aberrations which are to be produced by the aspherical surface. In order to obtain positive values of $\Delta SA_i$ and $\Delta AS_i$ by using the aspherical surface on the front lens unit (the first lens component), it is necessary that $E_i'(n_{i-1} - n_i)$ has a positive value. When $E_i'(n_{i-1} - n_i)$ has a positive value, however, $\Delta CM_i$ has a negative value, whereby the residual aberrations are undesirably aggravated by the aspherical surface. It is therefore not so desirable to correct aberrations by using the aspherical surface. However, it is possible to correct aberrations favorably in the optical system when coma produced by the aspherical surface is corrected with a spherical lens element and remarkable spherical aberration produced by the spherical lens element is corrected sufficiently favorably with the aspherical surface. Further, when a positive value is imparted to $E_i'(n_{i-1} - n_i)$ by using the aspherical surface in the rear lens unit (the second lens component) which is disposed after the aperture stop, all of $\Delta SA_i$, $\Delta CM_i$ and $\Delta AS_i$ have positive values and it is possible to cancel the residual aberrations which would remain in a case where the aspherical surface is not used. It is therefore desirable to use the aspherical surface satisfying the condition (8) in the rear lens unit (the second lens component). In addition, for efficient correction of spherical aberration and coma which have a large influence on enlargement of a numerical aperture, it is suited to locate the aspherical surface as a surface on which marginal rays are relatively high and which produces large amounts of aberrations with a strong refractive power. It is therefore most desirable to use the aspherical surface as an image side surface of the rear lens unit (the second lens component).

Furthermore, when the aspherical surface is used as the image side surface of the rear lens unit, it is more desirable that the aspherical surface coefficient of the sixth order of the aspherical surface satisfies the following condition (9):

$$F_i'(n_{i-1}-n_i) > 0 \qquad (9)$$

Since the image side surface of the rear lens unit has the strong refractive power as described above, this surface produces a large influence not only on aberrations of the third order but also aberrations of the fifth order. For this reason, it is possible to cancel the residual negative aberrations of the fifth order with the aberrations of the fifth order produced by the aspherical surface when the aspherical surface coefficient of the sixth order $F_i'$ which influences on the aberrations of the fifth order satisfies the above-mentioned condition (9). If the condition (9) is not satisfied, it will be difficult to correct the aberrations of the fifth order.

The above-mentioned condition (8) defines a sign of the aspherical surface coefficient $E_i'$. When a paraxial radius of curvature of the aspherical surface is represented by $r'$, it is possible to use departure $\Delta x(y)$ of the aspherical surface from the reference sphere thereof in place of the aspherical surface coefficient $E_i$.

Since $\Delta x(y)$ is equal to a value of x expressed by the formula (b) of aspherical surface in which the first term is omitted in the right side thereof, $\Delta x(y)$ is defined by the following formula (g):

$$\Delta x(y) = E_i'y^4 + F_i'y^6 + G_i'y^8 + \ldots \qquad (g)$$

Since all powers of y are even numbers in the formula (g) mentioned above, the aspherical surface coefficient has a sign which is the same as that of $\Delta x(y)$ which is under an influence thereof. It is therefore possible to define the sign by using the following condition (10) in place of the condition (8):

$$\Delta x(y)\{n_{i-1}-n_i\} > 0 \qquad (10)$$

$\Delta x(y)$ mentioned above is a function of y which is a distance as measured from the optical axis. For correction of spherical aberration as the primary object of the present invention, it is possible to use the following condition (11) at a location of $y = h_m$:

$$\Delta x(h_m) \cdot \{n_{i-1}-n_i\} > 0 \qquad (11)$$

wherein the reference symbol $h_m$ represents a height of a marginal ray (a ray coming from an object point located on the optical axis and passes through a marginal portion of the aperture stop) on the aspherical surface.

BRIEF DESCRIPTION OF THE DRAWINGS

FIG. 22A through FIG. 41D show graphs illustrating aberration characteristics of the first through twentieth embodiments of the present invention; and FIG. 42 shows a view illustrating a system of coordinates which is to be used for description of the embodiments of the present invention.

DETAILED DESCRIPTION OF THE PREFERRED EMBODIMENTS

Figure 1:
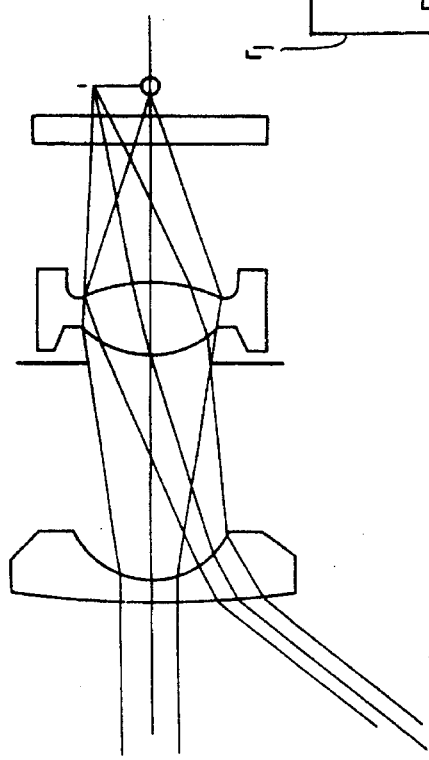
FIG. 1 shows a sectional view illustrating the composition of the conventional objective optical system for endoscopes.

Now, the objective optical system for endoscopes according to the present invention will be described more detailedly below with reference to the preferred embodiments illustrated in the accompanying drawings and given in the following numerical data:

---

Embodiment 1

$f = 1.000$, F number = 7.885, image height = 0.7681
object distance = ∞, $2\omega = 95°$ $r_1 = \infty$
  $d_1 = 0.16000$   $n_1 = 1.51633$   $\nu_1 = 64.15$
$r_2 = 1.0651$
  $d_2 = 0.0995$
$r_3 = \infty$ (stop)
  $d_3 = 0.0555$
$r_4 = -2.6556$
  $d_4 = 0.6035$   $n_2 = 1.88300$   $\nu_2 = 40.78$
$r_5 = -0.6447$
CJ/IH = 2.95, $f_1 = -2.063$, $f_2 = 0.8452$,
$|f_2/f_1| = 0.4097$, PS = 0.231

---

Embodiment 2

$f = 1.000$, F number = 9.206, image height = 0.8203,
object distance = ∞, $2\omega = 103.9°$ $r_1 = \infty$
  $d_1 = 0.1245$   $n_1 = 1.48749$   $\nu_1 = 70.20$
$r_2 = 0.5962$
  $d_2 = 0.1444$
$r_3 = \infty$ (stop)
  $d_3 = 0.0399$
$r_4 = -1.0447$
  $d_4 = 0.4290$   $n_2 = 1.78650$   $\nu_2 = 50.00$
$r_5 = -0.4557$
CJ/IH = 2.80, $f_1 = -1.223$, $f_2 = 0.7781$,
$|f_2/f_1| = 0.636$, PS = $-0.005$

---

Embodiment 3

$f = 1.000$, F number = 8.902, image height = 0.7727,
object distance = ∞, $2\omega = 94.1°$ $r_1 = 3.7962$
  $d_1 = 0.1179$   $n_1 = 1.48749$   $\nu_1 = 70.20$
$r_2 = 0.4925$
  $d_2 = 0.1085$
$r_3 = \infty$ (stop)
  $d_3 = 0.0632$
$r_4 = -0.9842$
  $d_4 = 0.3758$   $n_2 = 1.78650$   $\nu_2 = 50.00$
$r_5 = -0.4293$
CJ/IH = 2.81, $f_1 = -1.174$, $f_2 = 0.7459$,
$|f_2/f_1| = 0.635$, PS = $-0.001$

---

Embodiment 4

$f = 1.000$, F number = 2.917, image height = 0.7628,
object distance = ∞, $2\omega = 90°$ $r_1 = \infty$
  $d_1 = 0.4854$   $n_1 = 1.51633$   $\nu_1 = 64.15$
$r_2 = 0.6565$
  $d_2 = 0.2774$
$r_3 = \infty$ (stop)
  $d_3 = 0.3060$
$r_4 = 2.4894$
  $d_4 = 0.7628$   $n_2 = 1.56384$   $\nu_2 = 60.69$
$r_5 = -0.6511$ (aspherical surface)

aspherical surface coefficient $P_i = -0.1510$, $B_i = 0$, $E_i = -0.10713$,
$F_i = 0.73205 \times 10^{-11}$, $G_i = 0.15932$, $H_i = 0$,
$I_i = 0$, $E_i' = 0.4141$, $F_i' = 0.5951$, $G_i' = 0.9495$,
$H_i' = 1.2996$, $I_i' = 2.3005$, CJ/IH = 4.61,
$f_1 = -1.272$, $f_2 = 1.003$, $|f_2/f_1| = 0.789$,
PS = 0.18, $E_i'(n_{i-1} - n_i) \times f^3 = 0.2335$,
$F_i'(n_{i-1} - n_i) \times f^5 = 0.3355$,
$\Delta x(h_m) \cdot \{n_{i-1} - n_i\}/f = 0.001861$ -continued

Embodiment 5 f = 1.000,  F number = 2.671,  image height = 0.8393,
object distance = ∞,  2ω = 100°

$r_1 = \infty$
  $d_1 = 0.5341$  $n_1 = 1.51633$  $\nu_1 = 64.15$
$r_2 = 0.6843$
  $d_2 = 0.3053$
$r_3 = \infty$ (stop)
  $d_3 = 0.3386$
$r_4 = 2.4023$
  $d_4 = 0.8393$  $n_2 = 1.56384$  $\nu_2 = 60.69$
$r_5 = -0.6835$ (aspherical surface)

aspherical surface coefficient $P_i = -0.1510$, $B_i = 0$, $E_i = -0.60721 \times 10^{-1}$,
$F_i = 0.34347 \times 10^{-1}$, $G_i = 0.13393$, $H_i = 0$,
$I_i = 0$, $E_i' = 0.3899$, $F_i' = 0.4438$,
$G_i' = 0.6964$, $H_i' = 0.8394$, $I_i' = 1.3484$,
CJ/IH = 4.43, $f_1 = -1.325$, $f_2 = 1.046$,
$|f_2/f_1| = -0.789$, PS = 0.18,
$E_i'(n_{i-1} - n_i) \times f^3 = 0.2198$,
$F_i'(n_{i-1} - n_i) \times f^5 = 0.2502$,
$\Delta \times (h_m) \cdot \{n_{i-1} - n_i\}/f = 0.003138$

Embodiment 6 f = 1.000,  F number = 2.571,  image height = 0.9759,
object distance = ∞,  2ω = 120°

$r_1 = \infty$
  $d_1 = 0.6210$  $n_1 = 1.51633$  $\nu_2 = 64.15$
$r_2 = 0.7949$
  $d_2 = 0.5674$
$r_3 = \infty$ (stop)
  $d_3 = 0.3368$
$r_4 = 2.6326$
  $d_4 = 0.9557$  $n_2 = 1.56384$  $\nu_2 = 60.69$
$r_5 = -0.7648$ (aspherical surface)

aspherical surface coefficient $P_i = -0.1493$, $B_i = 0$, $E_i = -0.19413 \times 10^{-1}$,
$F_i = 0.20523 \times 10^{-1}$, $G_i = 0.60209 \times 10^{-1}$, $H_i = 0$,
$I_i = 0$, $E_i' = 0.3017$, $F_i' = 0.2541$,
$G_i' = 0.3163$, $H_i' = 0.3053$, $I_i' = 0.3917$,
CJ/IH = 4.36, $f_1 = -1.54$, $f_2 = 1.17$,
$|f_2/f_1| = 0.76$, PS = 0.18,
$E_i'(n_{i-1} - n_i) \times f^3 = 0.1701$,
$F_i'(n_{i-1} - n_i) \times f^5 = 0.1433$,
$\Delta \times (h_m) \cdot \{n_{i-1} - n_i\}/f = 0.002876$

Embodiment 7 f = 1.000,  F number = 3.173,  image height = 0.9306,
object distance = ∞,  2ω = 120°

$r_1 = \infty$
  $d_1 = 0.5922$  $n_1 = 1.88300$  $\nu_1 = 40.78$
$r_2 = 1.2420$
  $d_2 = 0.8593$
$r_3 = \infty$ (stop)
  $d_3 = 0.5877$
$r_4 = = 2.3824$
  $d_4 = 0.8460$  $n_2 = 1.51633$  $\nu_2 = 64.15$
$r_5 = -0.8852$ (aspherical surface)

aspherical surface coefficient $P_i = -0.1510$, $B_i = 0$, $E_i = 0.28385 \times 10^{-1}$,
$F_i = 0.17276 \times 10^{-1}$, $G_i = 0.22293 \times 10^{-1}$, $H_i = 0$,
$I_i = 0$, $E_i' = 0.2358$, $F_i' = 0.1296$
$G_i' = 0.1143$, $H_i' = 0.08190$, $I_i' = 0.07843$
CJ/IH = 5.44, $f_1 = -1.407$, $f_2 = 1.371$,
$|f_2/f_1| = 0.974$, PS = 0.15, $E_i'(n_{i-1} - n_i) \times f^3 = 0.1218$,
$F_i'(n_{i-1} - n_i) \times f^5 = 0.06692$,
$\Delta \times (h_m) \cdot \{n_{i-1} - n_i\}/f \times 0.001859$

Embodiment 8 f = 1.000,  F number = 2.847,  image height = 1.0496,
object distance = ∞,  2ω = 120°

$r_1 = 5.7252$
  $d_1 = 0.6107$  $n_1 = 1.51633$  $\nu_1 = 64.15$
$r_2 = 0.6376$
  $d_2 = 0.9367$
$r_3 = \infty$ (stop)
  $d_3 = 0.1040$
$r_4 = 2.0459$
  $d_4 = 1.0279$  $n_2 = 1.56384$  $\nu_2 = 60.69$
$r_5 = -0.8414$ (aspherical surface)

aspherical surface coefficient $P_i = 0.0017$, $B_i = 0$, $E_i = -0.18736 \times 10^{-1}$,
$F_i = 0.18167$, $G_i = 0.56209 \times 10^{-1}$, $H_i = 0$,
$I_i = 0$, $E_i' = 0.1908$, $F_i' = 0.3299$,
$G_i' = 0.1870$, $H_i' = 0.1294$, $I_i' = 0.1371$,
CJ/IH = 4.30, $f_1 = -1.449$, $f_2 = 1.213$,
$|f_2/f_1| = 0.837$, PS = 0.13,
$E_i'(n_{i-1} - n_i) \times f^3 = 0.1076$,
$F_i'(n_{i-1} - n_i) \times f^5 = 0.1860$,
$\Delta \times (h_m) \cdot \{n_{i-1} - n_i\}/f = 0.001522$

Embodiment 9 f = 1.000,  F number = 4.818,  image height = 0.8119,
object distance = ∞,  2ω = 100°

$r_1 = \infty$ (aspherical surface)
  $d_1 = 0.1723$  $n_1 = 1.51633$  $\nu_1 = 64.15$
$r_2 = 0.9712$
  $d_2 = 0.0317$
$r_3 = \infty$ (stop)
  $d_3 = 0.0632$
$r_4 = 6.8326$
  $d_4 = 0.4664$  $n_2 = 1.69680$  $\nu_2 = 55.52$
$r_5 = -0.5709$ aspherical surface coefficient $P_i = 1.0000$, $B_i = 0$, $E_i = -0.17041 \times 10$,
$F_i = 0.21442 \times 10^2$, $G_i = -0.12273 \times 10^3$, $H_i = 0$,
$I_i = 0$, CJ/IH = 2.34, $f_1 = -1.881$, $f_2 = 0.776$,
$|f_2/f_1| = 0.413$, PS = 0.429,
$E_i'(n_{i-1} - n_i) \times f^3 = 0.8799$,
$\Delta \times (h_m) \cdot \{n_{i-1} - n_i\}/f = 0.000090$

Embodiment 10 f = 1.000,  F number = 4.735,  image height = 0.8206,
object distance = ∞,  2ω = 100°

$r_1 = \infty$
  $d_1 = 0.1742$  $n_1 = 1.51633$  $\nu_1 = 64.15$
$r_2 = 0.7717$ (aspherical surface)
  $d_2 = 0.0228$
$r_3 = \infty$ (stop)
  $d_3 = 0.0520$
$r_4 = \infty$
  $d_4 = 0.4889$  $n_2 = 1.69680$  $\nu_2 = 55.52$
$r_5 = -0.5190$ aspherical surface coefficient $P_i = 1.0000$, $B_i = 0$, $E_i = 0.37204 \times 10$,
$F_i = -0.14004 \times 10^3$, $G_i = 0.40069 \times 10^4$, $H_i = 0$,
$I_i = 0$, CJ/IH = 2.41, $f_1 = -1.495$, $f_2 = 0.745$,
$|f_2/f_1| = 0.498$, PS = 0.35, $E_i'(n_{i-1} - n_i) \times f^3 = 1.9210,$
$\Delta \times (h_m) \cdot \{n_{i-1} - n_i\}/f = 0.000173$

Embodiment 11 f = 1.000,  F number = 4.205,  image height = 0.8150,
object distance = ∞,  2ω = 100°

$r_1 = \infty$
  $d_1 = 0.1893$   $n_1 = 1.51633$   $v_1 = 64.15$
$r_2 = 1.4020$
  $d_2 = 0.2561$
$r_3 = \infty$ (stop)
  $d_3 = 0.0137$
$r_4 = -2.0773$ (aspherical surface)
  $d_4 = 0.4722$   $n_2 = 1.56384$   $v_2 = 60.69$
$r_5 = -0.4401$ aspherical surface coefficient $P_i = 1.0000, B_i = 0, E_i = -0.36629 \times 10,$
$F_i = -0.60289 \times 10^2, G_i = 0.10021 \times 10^4, H_i = 0,$
$I_i = 0, CJ/IH = 2.74, f_1 = -2.715, f_2 = 0.897,$
$|f_2/f_1| = 0.33, PS = 0.403,$
$E_i'(n_{i-1} - n_i) \times f^3 = 2.0653,$
$F_i'(n_{i-1} - n_i) \times f^5 = 33.993,$
$\Delta \times (h_m) \cdot \{n_{i-1} - n_i\}/f = 0.000708$

Embodiment 12 f = 1.000,  F number = 3.927,  image height = 1.0139,
object distance = ∞,  2ω = 140°

$r_1 = \infty$
  $d_1 = 0.2151$   $n_1 = 1.51633$   $v_1 = 64.15$
$r_2 = 2.0588$
  $d_2 = 0.1499$
$r_3 = \infty$ (stop)
  $d_3 = 0.0396$
$r_4 = -3.4926$
  $d_4 = 0.0978$   $n_2 = 1.80518$   $v_2 = 25.43$
$r_5 = 0.7762$
  $d_5 = 0.4941$   $n_3 = 1.81600$   $v_3 = 46.62$
$r_6 = -0.6650$
  PS = 0.387

Embodiment 13 f = 1.000,  F number = 3.978,  image height = 0.9862,
object distance = ∞,  2ω = 130°

$r_1 = \infty$
  $d_1 = 0.2093$   $n_1 = 1.77250$   $v_1 = 49.66$
$r_2 = 2.0904$
  $d_2 = 0.0613$
$r_3 = \infty$ (stop)
  $d_3 = 0.0386$
$r_4 = -4.9556$
  $d_4 = 0.0952$   $n_2 = 1.80518$   $v_2 = 25.43$
$r_5 = 0.8480$
  $d_5 = 0.4808$   $n_3 = 1.81600$   $v_3 = 46.62$
$r_6 = -0.6447$
  PS = 0.403

Embodiment 14 f = 1.000,  F number = 4.456,  image height = 0.8742,
object distance = ∞,  2ω = 110°

$r_1 = \infty$
  $d_1 = 0.1856$   $n_1 = 1.72916$   $v_1 = 54.68$
$r_2 = 1.4756$
  $d_2 = 0.0341$
$r_3 = \infty$ (stop)
  $d_3 = 0.0878$
$r_4 = -5.6354$
  $d_4 = 0.0845$   $n_2 = 1.80518$   $v_2 = 25.43$
$r_5 = 0.8362$
  $d_5 = 0.3983$   $n_3 = 1.81600$   $v_3 = 46.62$
$r_6 = -0.6145$
  PS = 0.37

Embodiment 15 f = 1.000,  F number = 4.437,  image height = 0.8778,
object distance = ∞,  2ω = 110°

$r_1 = \infty$
  $d_1 = 0.1863$   $n_1 = 1.72916$   $v_1 = 54.68$
$r_2 = 1.5402$
  $d_2 = 0.0343$
$r_3 = \infty$ (stop)
  $d_3 = 0.0993$
$r_4 = 9.7981$
  $d_4 = 0.0848$   $n_2 = 1.84666$   $v_2 = 23.78$
$r_5 = 0.8996$
  $d_5 = 0.4000$   $n_3 = 1.72916$   $v_3 = 54.68$
$r_6 = -0.5754$
  PS = 0.465

Embodiment 16 f = 0.999,  F number = 4.025,  image height = 0.9926,
object distance = ∞,  2ω = 140°

$r_1 = \infty$
  $d_1 = 0.2106$   $n_1 = 1.51633$   $v_1 = 64.15$
$r_2 = 2.3331$ (aspherical surface)
  $d_2 = 0.1489$
$r_3 = \infty$ (stop)
  $d_3 = 0.0333$
$r_4 = \infty$
  $d_4 = 0.0782$   $n_2 = 1.80518$   $v_2 = 25.43$
$r_5 = 0.7599$
  $d_5 = 0.4468$   $n_3 = 1.81600$   $v_3 = 46.62$
$r_6 = -0.7442$ aspherical surface coefficient $P_i = 1.0000, B_i = 0, E_i = 0.21919 \times 10,$
$F_i = -0.15432 \times 10^2, G_i = 0.10528 \times 10^3,$
$E_i' = 2.1919, F_i' = -15.432, G_i' = 105.28,$
$H_i' = 0, I_i' = 0, E_i'(n_{i-1} - n_i) = 1.1317,$
$\Delta \times (h_m) \cdot \{n_{i-1} - n_i\} = 2.416 \times 10^{-4}, PS = 0.462$

Embodiment 17 f = 1.000,  F number = 3.878,  image height = 1.0188,
object distance = ∞,  2ω = 140°

$r_1 = \infty$
  $d_1 = 0.2162$   $n_1 = 1.51633$   $v_1 = 64.15$
$r_2 = 2.4934$ (aspherical surface)
  $d_2 = 0.1299$
$r_3 = \infty$ (stop)
  $d_3 = 0.0342$
$r_4 = -3.0474$
  $d_4 = 0.1241$   $n_2 = 1.80518$   $v_2 = 25.43$
$r_5 = 0.7800$
  $d_5 = 0.4969$   $n_3 = 1.81600$   $v_3 = 46.62$
$r_6 = -0.6650$ aspherical surface coefficient $P_i = 1.0000, B_i = 0, E_i = 0.81161,$
$F_i = -0.11324 \times 10^2, G_i = 0.46435 \times 10^2,$
$E_i' = 0.81161, F_i' = -11.324, G_i' = 46.435,$
$H_i' = 0, I_i' = 0, E_i'(n_{i-1} - n_i) = 0.4191,$
$\Delta \times (h_m) \cdot \{n_{i-1} - n_i\} = 9.094 \times 10^{-5}, PS = 0.397$

Embodiment 18 f = 1.000,  F number = 4.680,  image height = 0.8476,
object distance = ∞,  2ω = 110°

$r_1 = \infty$
  $d_1 = 0.1799$   $n_1 = 1.72916$   $v_1 = 54.68$
$r_2 = 1.2535$ -continued $d_2 = 0.0608$
$r_3 = \infty$ (stop)
 $d_3 = -0.1109$
$r_4 = \infty$ (aspherical surface)
 $d_4 = 0.1520$  $n_2 = 1.84666$  $\nu_2 = 23.88$
$r_5 = 0.8776$
 $d_5 = 0.4203$  $n_3 = 1.81600$  $\nu_3 = 46.62$
$r_6 = -0.6499$ aspherical surface coefficient $P_i = 1.0000$, $B_i = 0$, $E_i = -0.79869$,
$F_i = 0.84299 \times 10$, $G_i = -0.43452 \times 10^2$
$E_i' = -0.79869$, $F_i' = 8.4299$, $G_i' = -43.452$,
$H_i' = 0$, $I_i' = 0$, $E_i' \cdot (n_{i-1} - n_i) = 0.6762$,
$\Delta \times (h_m) \cdot \{n_{i-1} - n_i\} = 1.097 \times 10^{-4}$, PS = 0.345

Embodiment 19 f = 1.000,  F number = 4.653,  image height = 0.8507,
        object distance = ∞,  2ω = 110°

$r_1 = \infty$
 $d_1 = 0.1806$  $n_1 = 1.72916$  $\nu_1 = 54.68$
$r_2 = 1.1780$
 $d_2 = 0.0541$
$r_3 = \infty$ (stop)
 $d_3 = 0.1132$
$r_4 = -10.6961$ (aspherical surface)
 $d_4 = 0.1143$  $n_2 = 1.84666$  $\nu_2 = 23.88$
$r_5 = 0.8869$
 $d_5 = 0.4080$  $n_3 = 1.81600$  $\nu_3 = 46.62$
$r_6 = -0.6145$ aspherical surface coefficient $P_i = 1.0000$, $B_i = 0$, $E_i = -0.53141$,
$F_i = 0.69161 \times 10$, $G_i = -0.45286 \times 10^2$,
$E_i' = -0.53141$, $F_i' = 6.9161$, $G_i' = -45.286$,
$H_i' = 0$, $I_i' = 0$, $E_i' = (n_{i-1} - n_i) = 0.4499$,
$\Delta \times (h_m) \cdot \{n_{i-1} = n_i\} = 7.286 \times 10^{-5}$, PS = 0.32

Embodiment 20 f = 1.000,  F number = 4.724,  image height = 0.8787,
        object distance = ∞,  2ω = 110°

$r_1 = \infty$
 $d_1 = 0.1865$  $n_1 = 1.72916$  $\nu_1 = 54.68$
$r_2 = 0.8865$
 $d_2 = 0.1040$
$r_3 = \infty$ (stop)
 $d_3 = 0.0331$
$r_4 = 3.5253$
 $d_4 = 0.2660$  $n_2 = 1.80518$  $\nu_2 = 25.43$
$r_5 = 0.8933$
 $d_5 = 0.4237$  $n_3 = 1.66524$  $\nu_3 = 55.10$
$r_6 = -0.5260$ (aspherical surface)

aspherical surface coefficient $P_i = 1.0000$, $B_i = 0$, $E_i = 0.32363$,
$F_i = -0.14738 \times 10$, $G_i = 0.10795 \times 10^2$,
$E_i' = 0.32363$, $F_i' = -1.4738$, $G_i' = 10.795$,
$H_i' = 0$, $I_i' = 0$, $E_i' = (n_{i-1} - n_i) = 0.2153$,
$\Delta \times (h_m) \cdot \{n_{i-1} - n_i\} = 8.981 \times 10^{-5}$, PS = 0.358

Each of the first through eleventh embodiments of the present invention is an objective optical system which comprises a first lens component consisting of a single negative lens element and a second lens component consisting of a single positive lens element.

Figure 2:
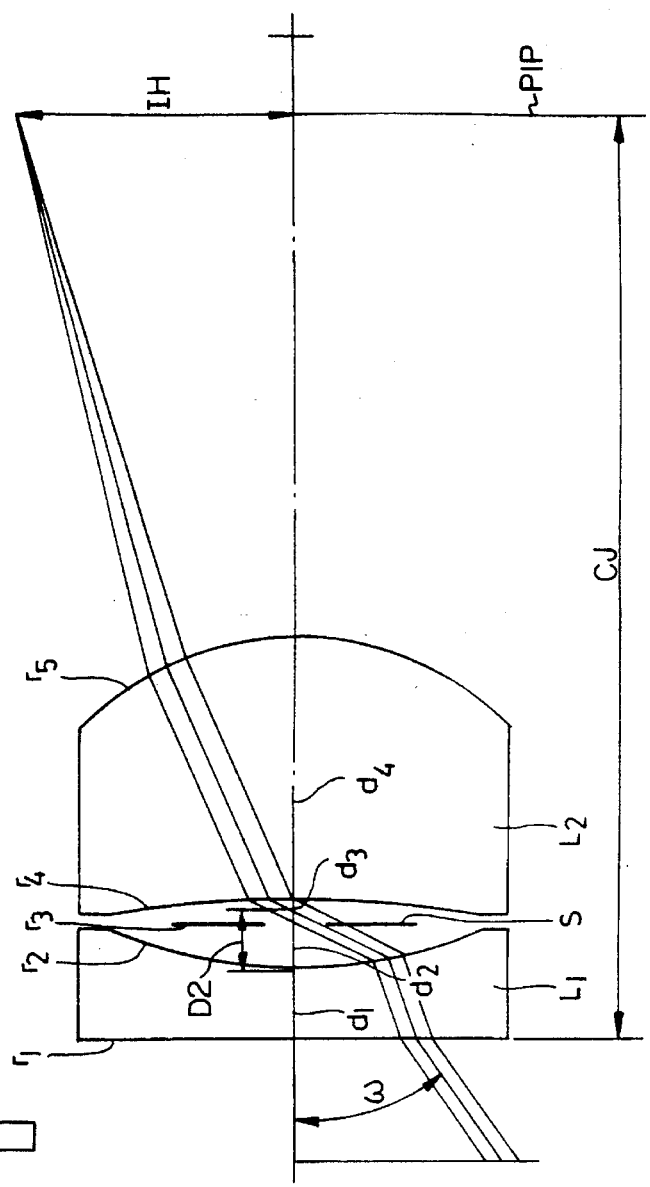
FIG. 2 through FIG. 21 show sectional views illustration compositions of first through twentieth embodiments of the objective optical system for endoscopes according to the present invention.
Figure 3:
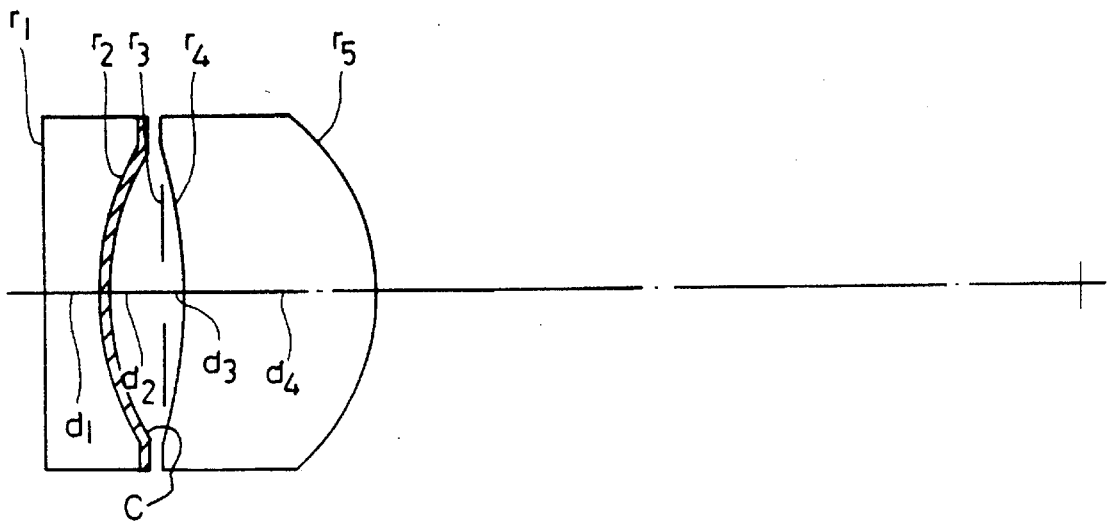
Figure 4:
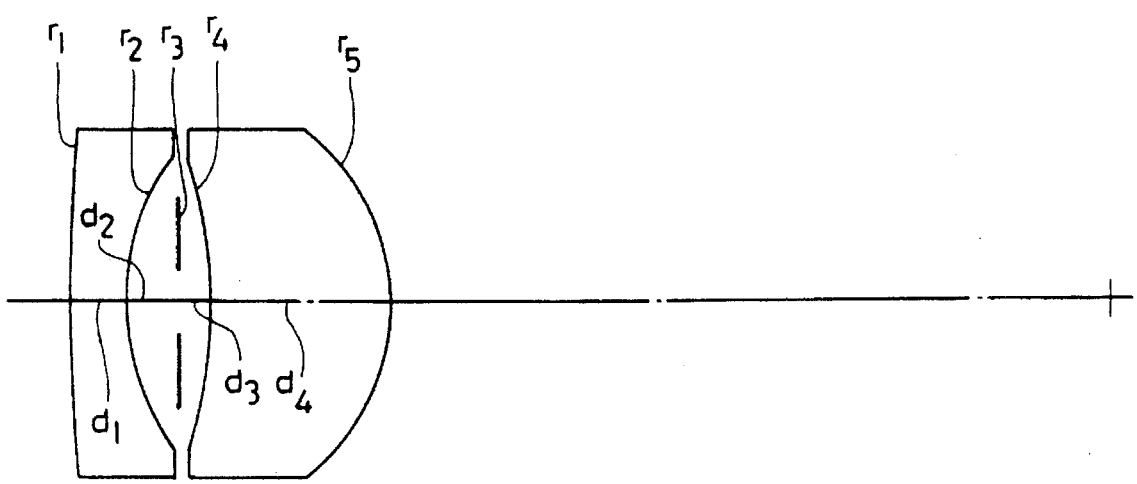
Figure 5:
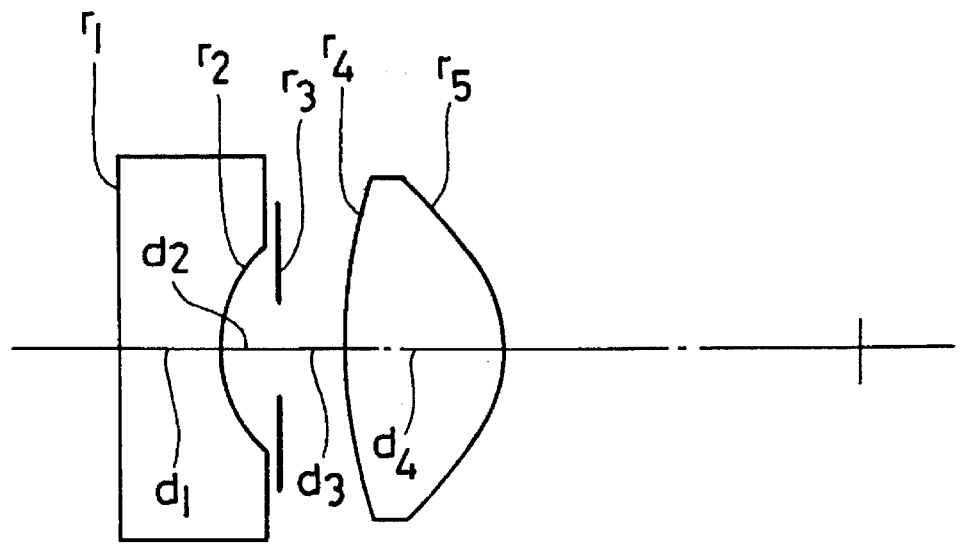
Figure 6:
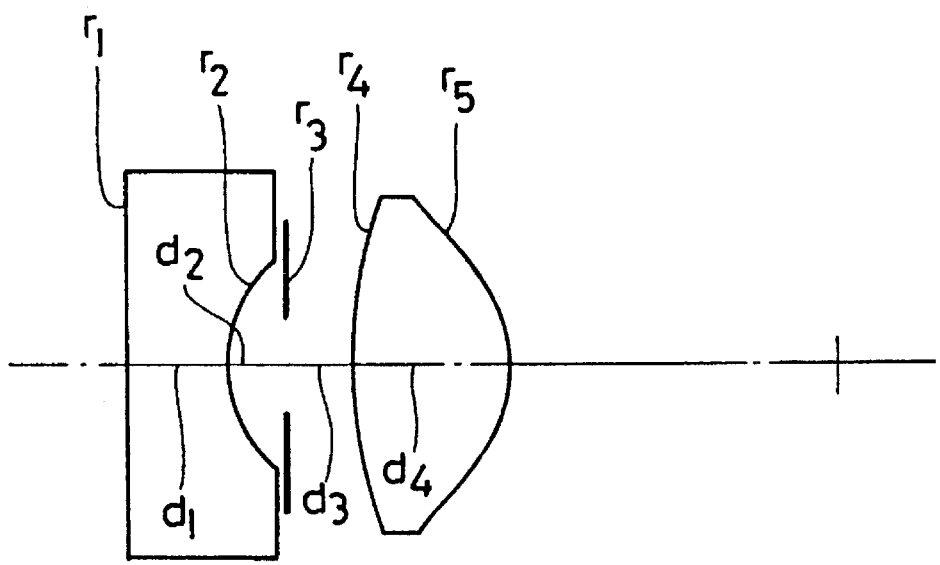
Figure 7:
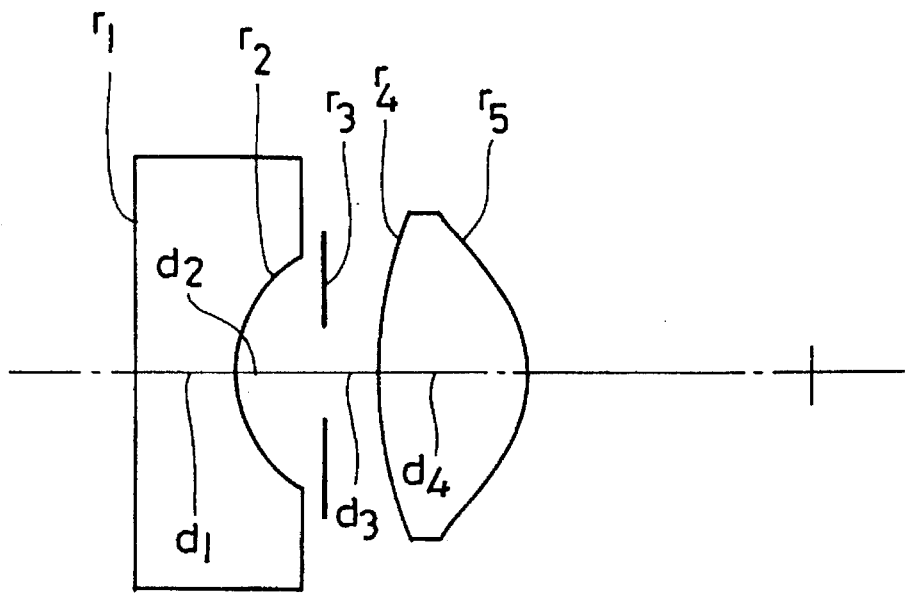
Figure 8:
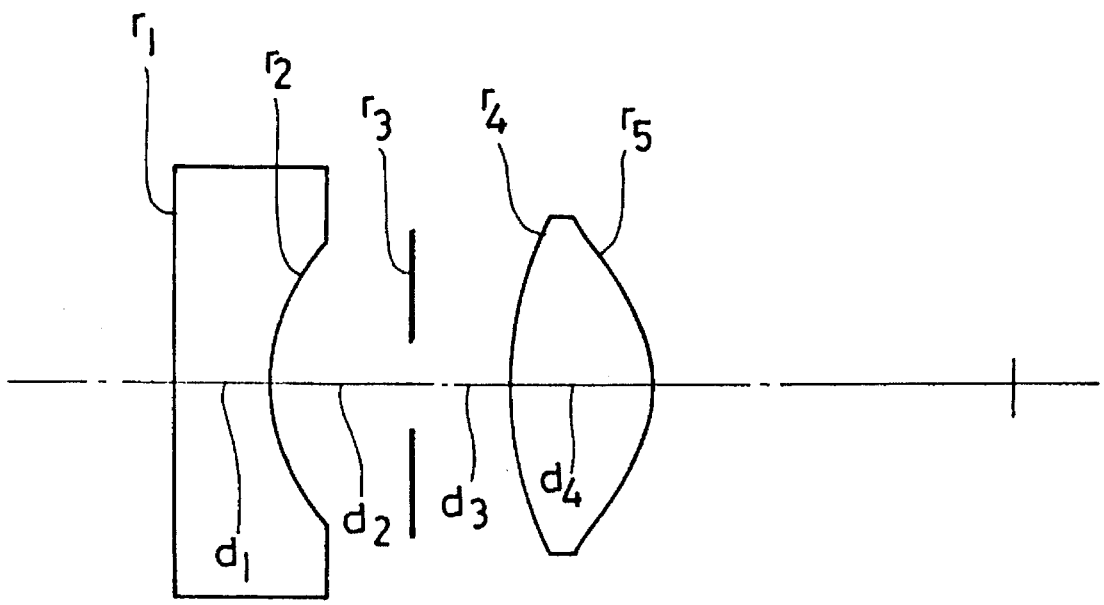
Figure 9:
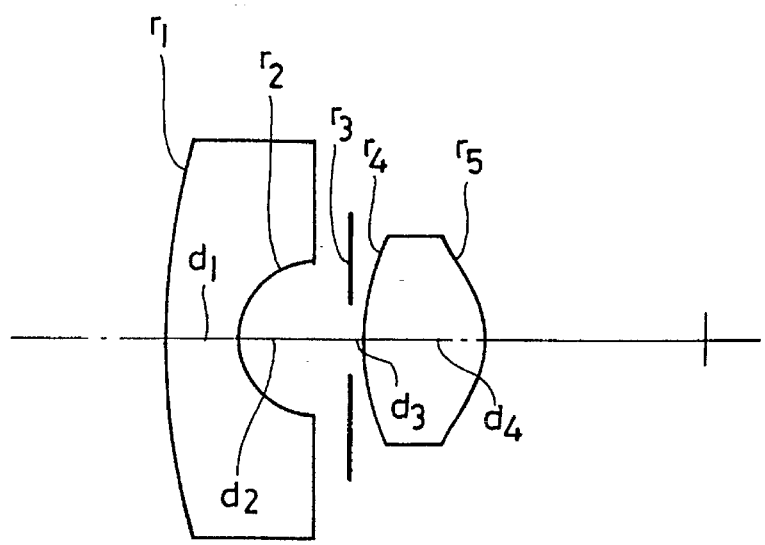

The first through third embodiments have compositions illustrated in FIG. 2 through FIG. 4 respectively and have relatively long back focal lengths. Accordingly, each of the first through third embodiments is configured so as to prevent the objective optical system from mechanically interfering with a solid-state image pickup device even when the image pickup device used as a light receiving section has a diameter larger than that of the optical system. The image pickup device is disposed in parallel with the longitudinal direction of a distal end of an endoscope and the optical axis is bent at an angle of 90° by disposing a mirror or a prism after the second lens component.

Out of these embodiments, the first embodiment has a field angle of 90°, the second embodiment has a field angle of 103.9° and coating C on a first lens component and the third embodiment has a field angle of 94.1°. The first embodiment uses a first lens component which has a convex surface on the object side for correcting coma and astigmatism more favorably.

The fourth through eighth embodiments have compositions illustrated in FIG. 5 through FIG. 9 respectively in each of which an image side surface of the second lens component is configured as an aspherical surface. The fourth embodiment has a field angle of 90°, the fifth embodiment has a field angle of 100°, and each of the sixth, seventh and eighth embodiments has a field angle of 120°. Out of these embodiments, the seventh embodiment uses a glass material having a high refractive index for enhancing manufacturability of the first lens component and adopts a large radius of curvature. In the eighth embodiment, the first lens component has an object side surface configured as a convex surface for more favorable correction of coma and astigmatism. Each of these embodiments can be used with video scopes when an infrared cutoff filter and a YAG cutoff filter are disposed between the second lens component and a solid-state image pickup device.

Figure 10:
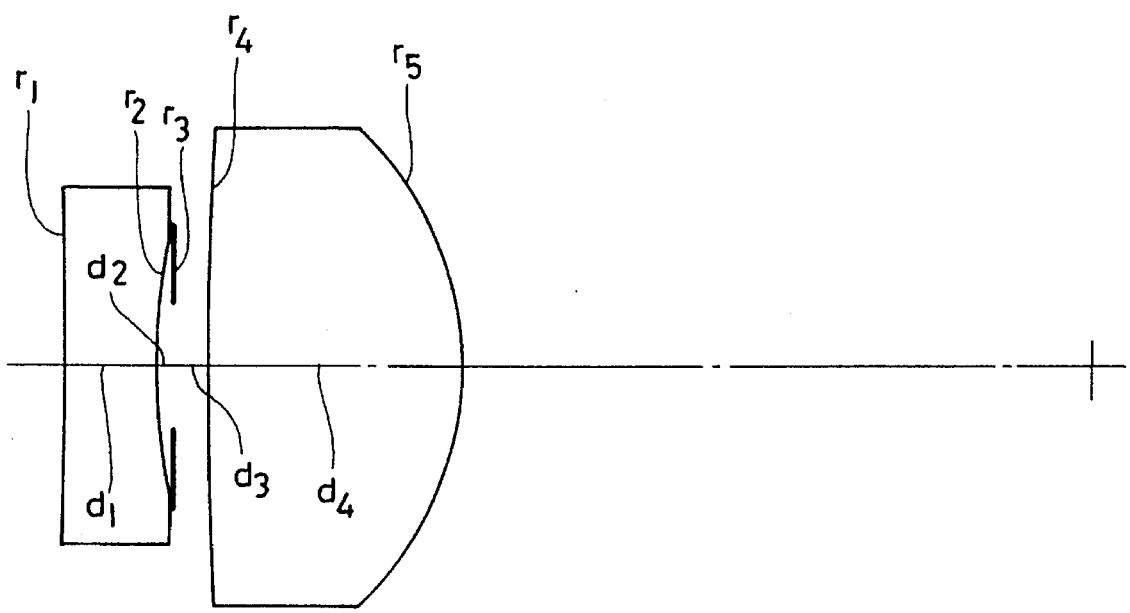
Figure 11:
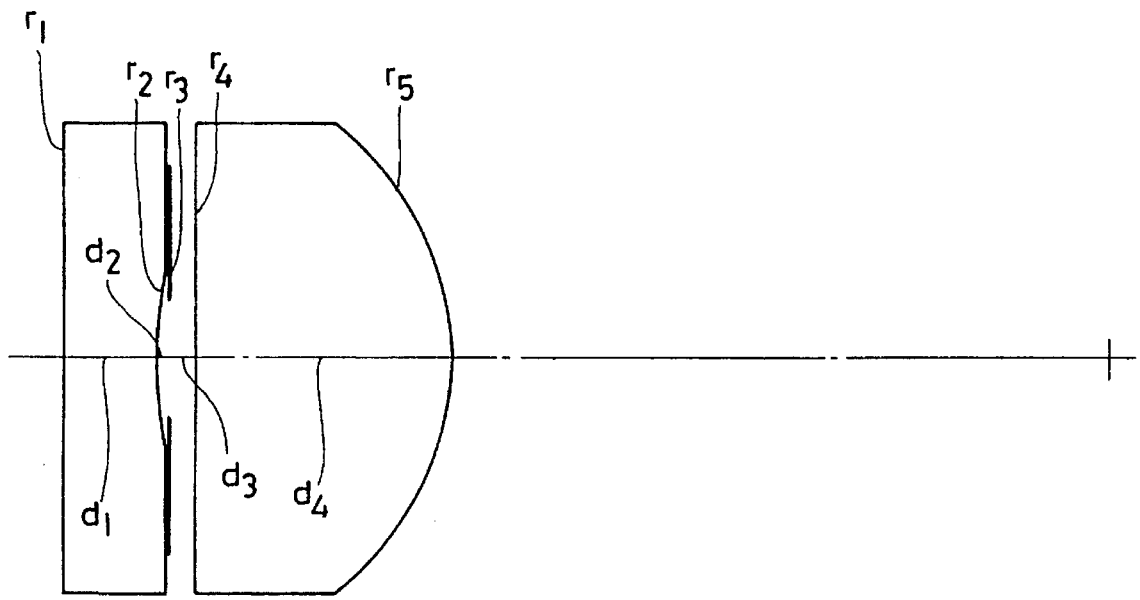

The ninth embodiment has a composition illustrated in FIG. 10, uses an aspherical surfce as an object side surface of the first lens component for correcting mainly astigmatism, and has favorably corrected spherical aberration and coma. In the ninth embodiment wherein the aspherical surface is disposed after an aperture stop, $\Delta SA_i$ and $\Delta AS_i$ expressed by the formulae (d) and (f) have positive values, and spherical aberration and astigmatism are corrected by the aspherical surface. However, $\Delta CM_1$ expressed by the formula (e) has a negative value, whereby coma is aggravated by the aspherical surface. In the objective optical system as a whole preferred as the ninth embodiment, however, the negative coma is corrected since the optical system is configured so that the offaxial principal ray is nearly perpendicular to the image side surface of the second lens component, whereby the second lens component produces negative coma in a little amount, and the negative coma which is produced by the object side aspherical surface of the first lens component is cancelled with the positive coma produced by the image side surface of the first lens component.

The tenth embodiment has a composition illustrated in FIG. 10, uses an aspherical surface as an image side surface of the first lens component, and has favorably corrected astigmatism and coma. Since the aspherical surface is disposed before an aperture stop also in the tenth embodiment, coma is aggravated by the aspherical surface as in the ninth embodiment. However, negative coma is corrected favorably in the objective optical system as a whole preferred as the ninth embodiment since the second lens component has an image side surface which is configured so that the offaxial principal ray is nearly perpendicular to this surface, whereby the second lens component produces negative coma in a little amount, and negative coma which is produced due to a function of an aspherical surface of an image side surface of the first lens component is cancelled with positive coma produced due to a function of a spherical surface of the image side surface.

Figure 12:
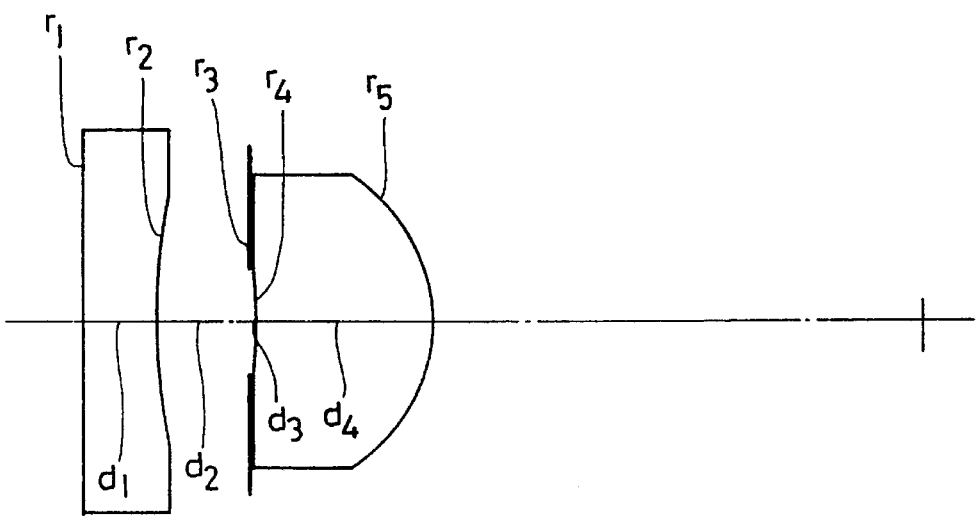

The eleventh embodiment has a composition illustrated in FIG. 12, uses an aspherical surface as an object side surface of the second lens component, and has favorably corrected coma and astigmatism. Though spherical aberration is favorably corrected by disposing the aspherical surface after an aperture stop in the eleventh embodiment, coma is overcorrected when spherical aberration is favorably corrected. In order to prevent coma from being overcorrected, an airspace reserved between the aspherical surface and the aperture stop is made as narrow as possible for correcting spherical aberration and coma favorably at the same time. When an aspherical surface is disposed immediately after an aperture stop as in the case of the ninth embodiment, it is almost impossible to correct astigmatism with the aspherical surface. However, it is possible to cancel negative astigmatism produced by the second lens component with positive astigmatism which is produced by the first lens component, and the eleventh embodiment of the present invention is configured so as to correct astigmatism favorably in the objective optical system preferred as the eleventh embodiment of the present invention.

Each of the twelfth through twentieth embodiments is an objective optical system in which lateral chromatic aberration and longitudinal chromatic aberration are corrected favorably by configuring the second lens component as a cemented lens component.

Figure 13:
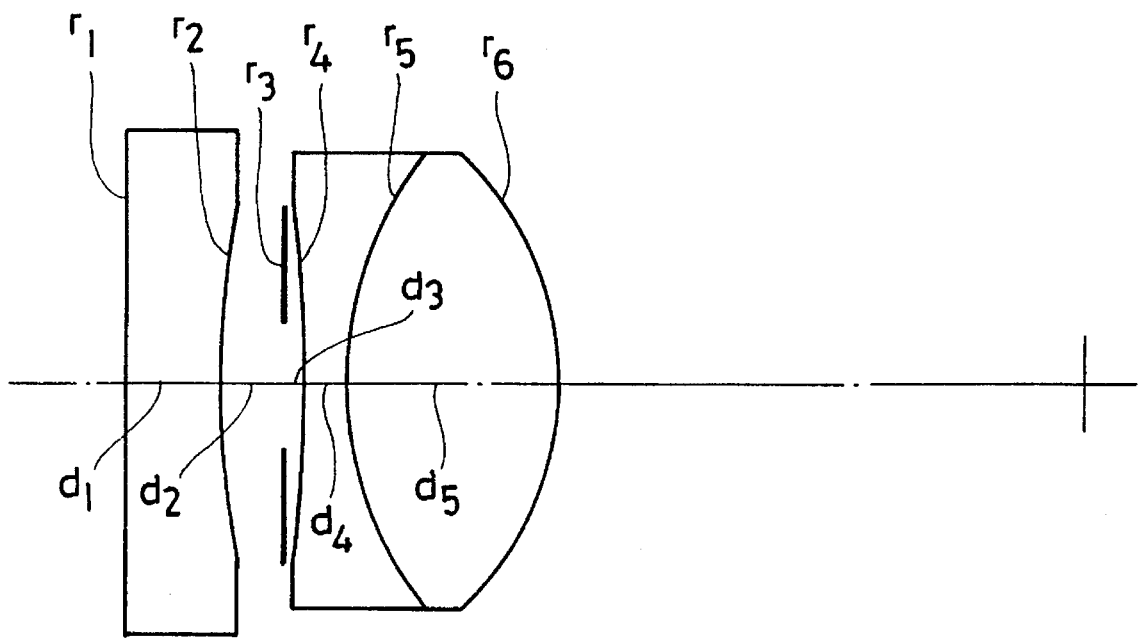
Figure 14:
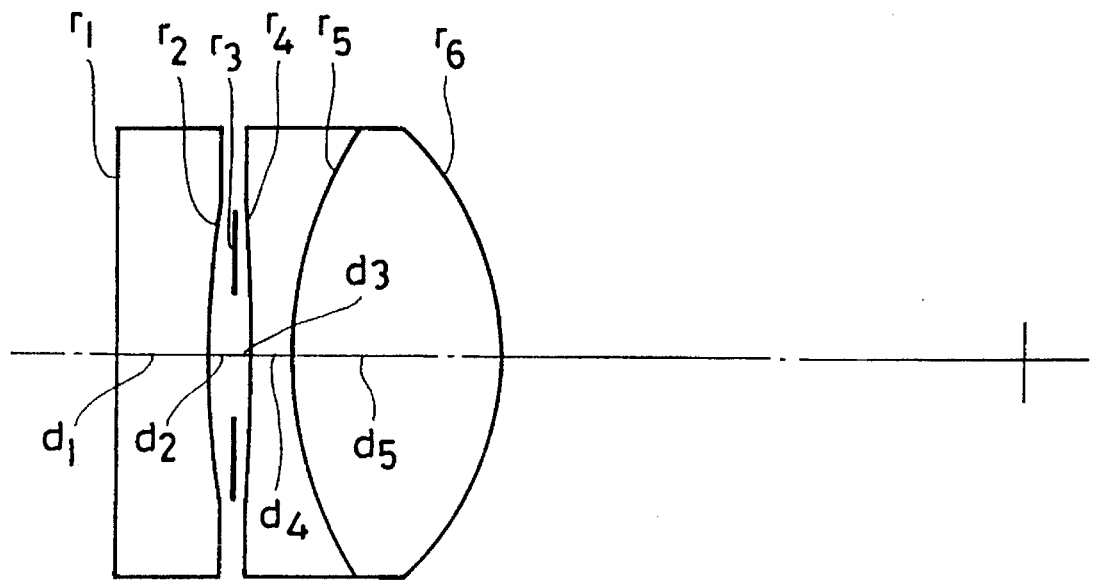
Figure 15:
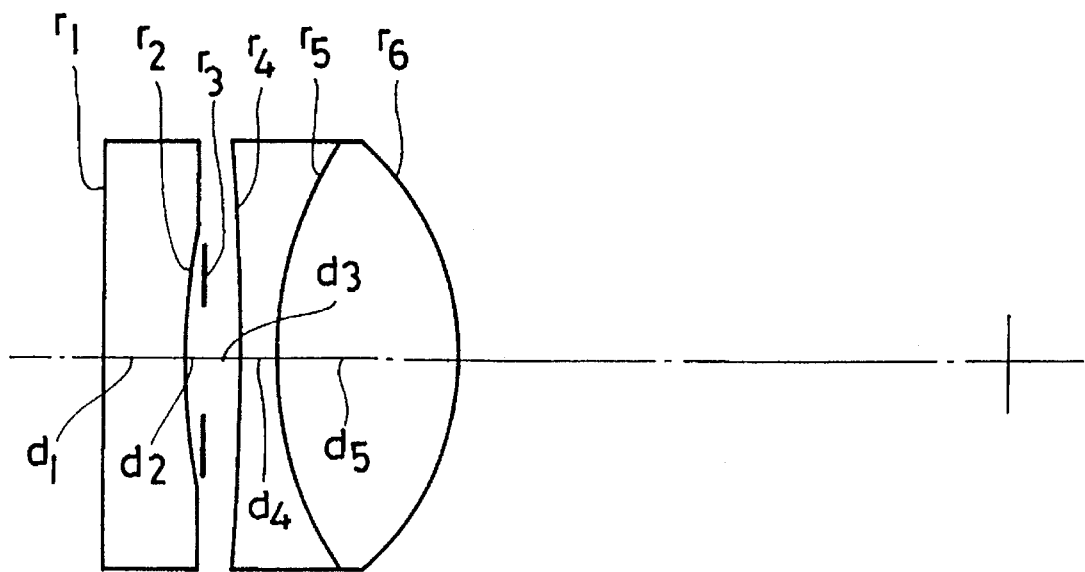

The twelfth through fourteenth embodiments have compositions illustrated in FIG. 13 through FIG. 15 respectively. Each of these embodiment is a super-wide angle objective optical system in which remarkable astigmatism produced by the first lens component is corrected by using an object side surface of a first lens element of the second lens component while maintaining favorably corrected lateral chromatic aberration and longitudinal chromatic aberration. The twelfth embodiment has a field angle of 140°, the thirteenth embodiment has a field angle of 130° and the fourteenth embodiment has a field angle of 110°.

Figure 16:
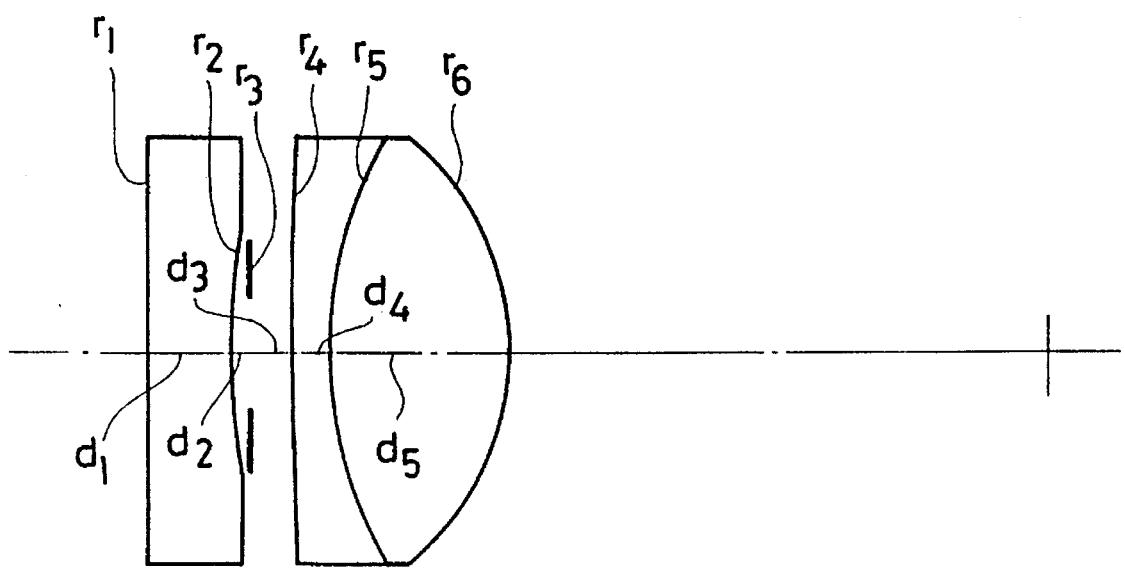
Figure 17:
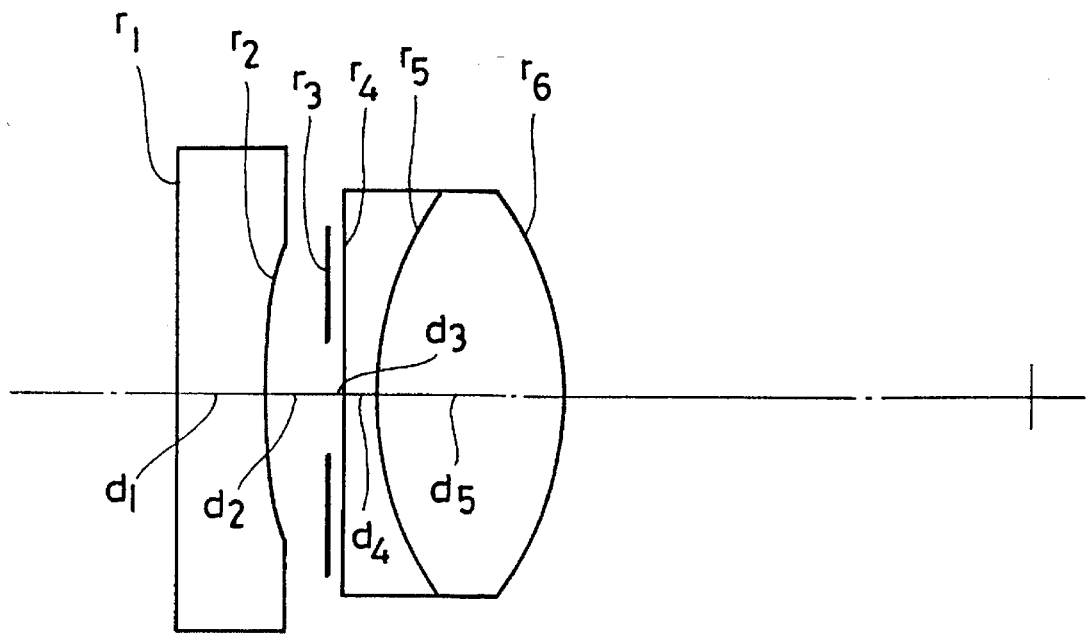
Figure 18:
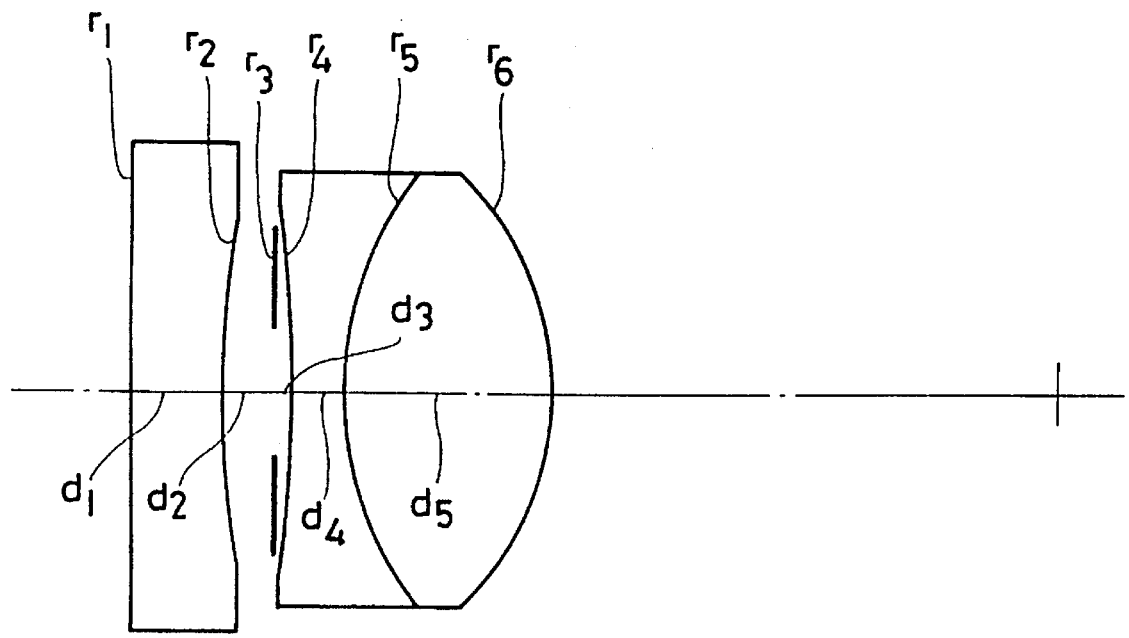

The fifteenth embodiment has a composition illustrated in FIG. 16, wherein a strong refractive power is imparted to a cemented surface disposed in the second lens component so that lateral chromatic aberration and longitudinal chromatic aberration are suppressed at sufficiently low levels, and the objective optical system has a wide field angle. In the fifteenth embodiment wherein the cemented surface has the strong refractive power for enhancing the function to correct the chromatic aberrations, remarkable astigmatism is produced also by the cemented surface. For enhancing the function to correct astigmatism, an object side surface of the first lens element disposed in the second lens component is designed as a convex surface. The fifteenth embodiment has a field angle of 110°.

The sixteenth and seventeenth embodiments are examples each of which has a super-wide angle of 140° owing to a fact that the second lens component has an image side surface designed as an aspherical surface. In each of the sixteenth and seventeenth embodiments, spherical aberration is corrected more favorably by configuring the image side surface of the second lens component as the aspherical surface while maintaining favorably corrected lateral chromatic aberration and longitudinal chromatic aberration.

Figure 19:
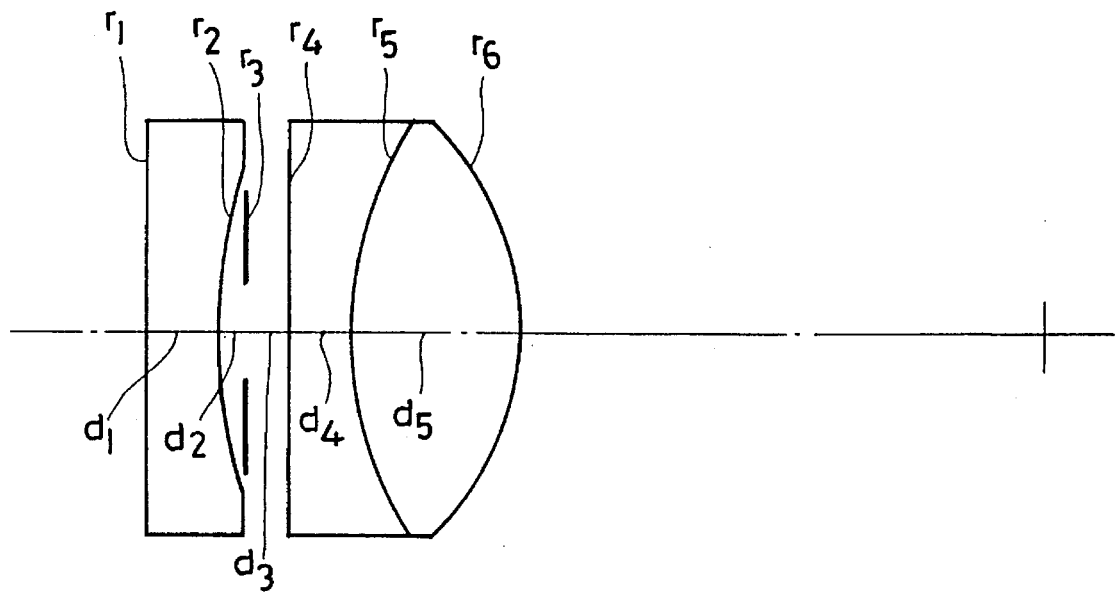
Figure 20:
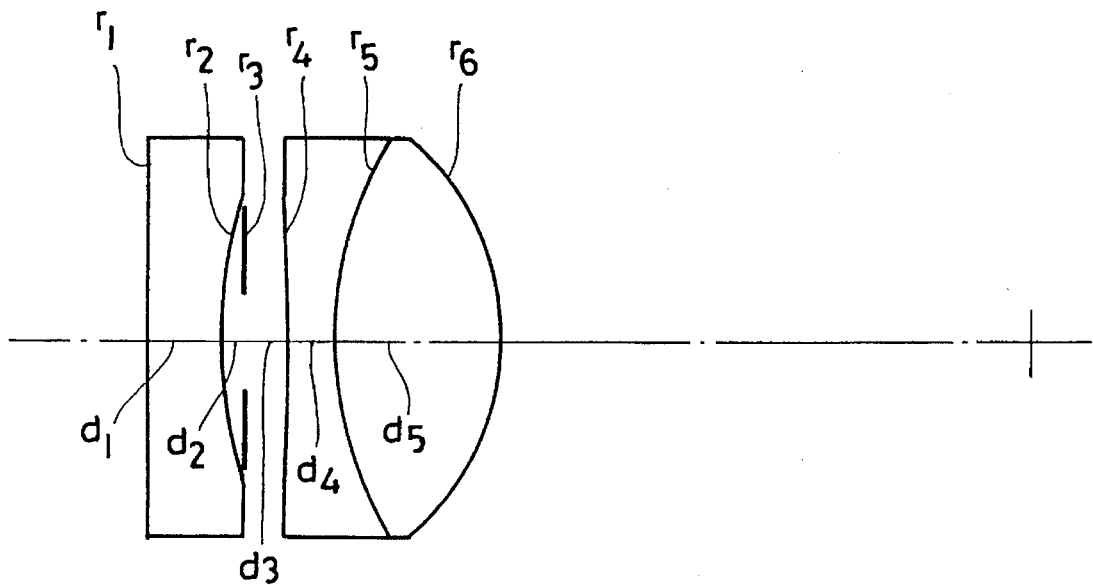

The eighteenth and nineteenth embodiments have compositions illustrated in FIG. 19 and FIG. 20 respectively. Each of these embodiments has a wide field angle of 110° owing to fact that an object side surface of a first lens element of the second lens component is configured as an aspherical surface. Each of the eighteenth and nineteenth embodiments is an objective optical system which has spherical aberration and coma corrected more favorably while maintaining favorably corrected lateral chromatic aberration and longitudinal chromatic aberration.

Figure 21:
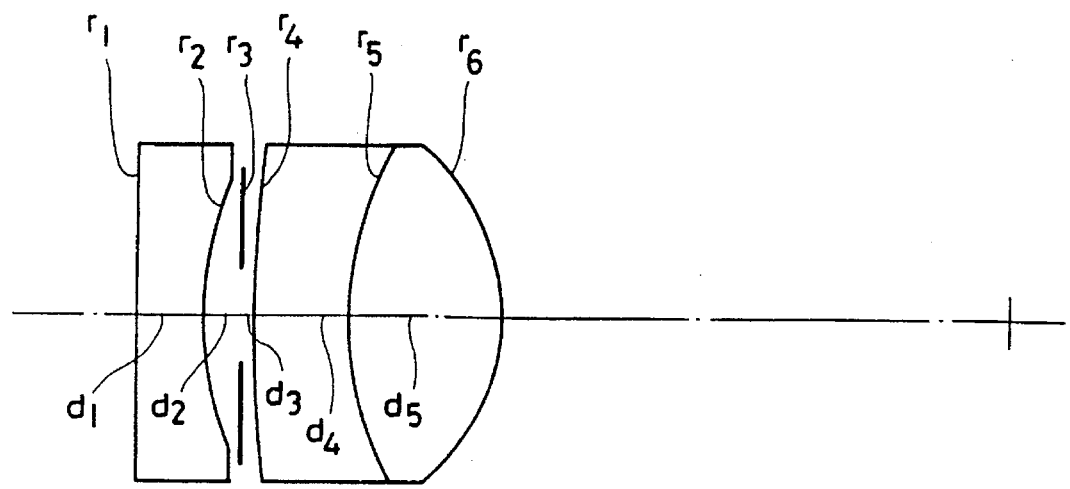
Figures 22A, 22B, 22C, 22D:
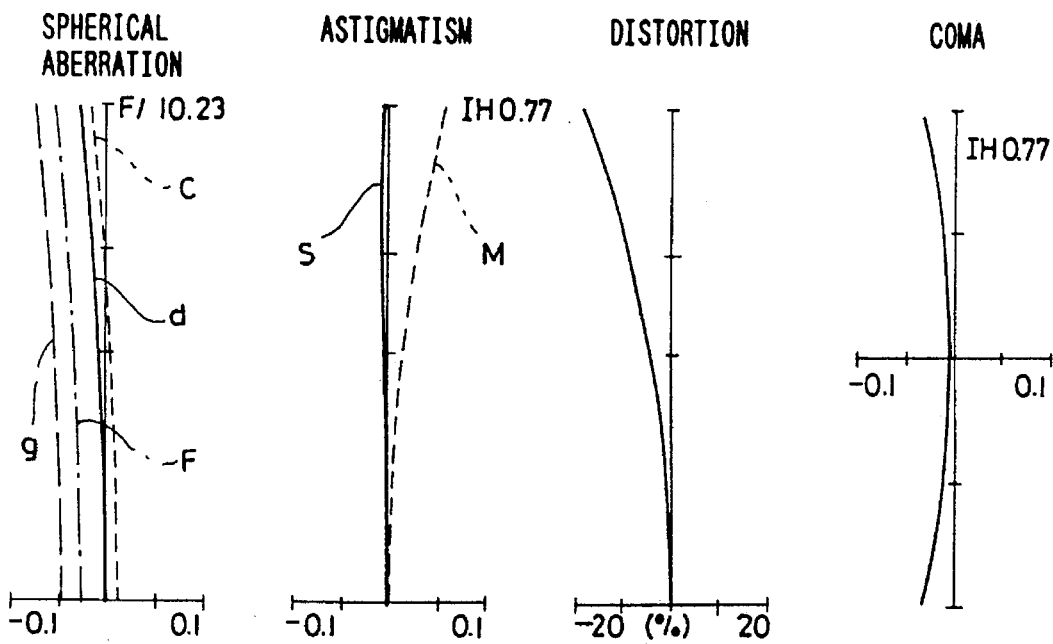
Figure 23A:
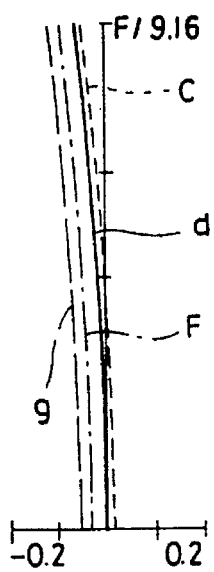
Figure 23B:
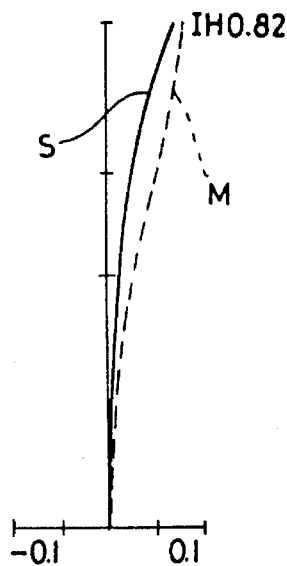
Figure 23C:
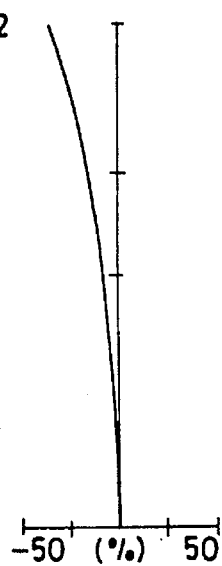
Figure 23D:
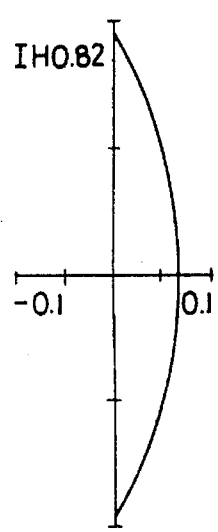
Figure 24A:
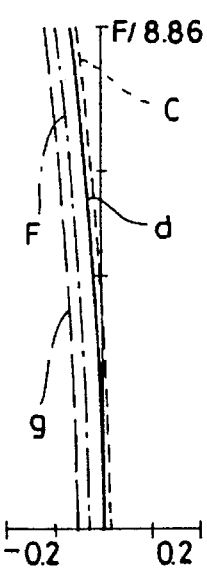
Figure 24B:
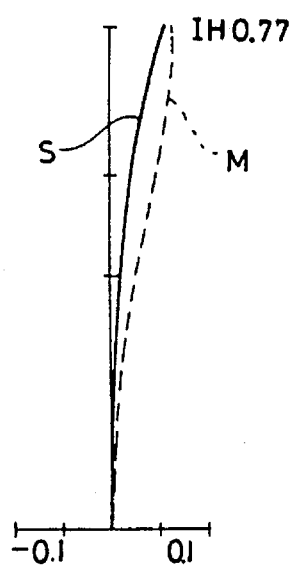
Figure 24C:
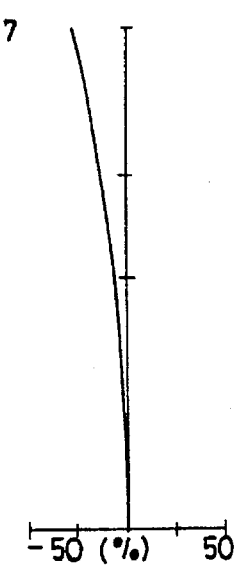
Figure 24D:
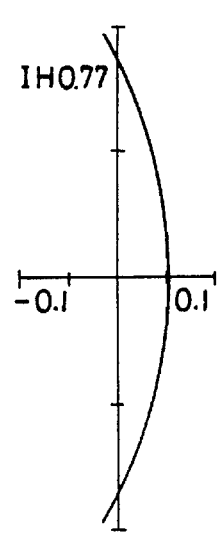
Figure 25A:
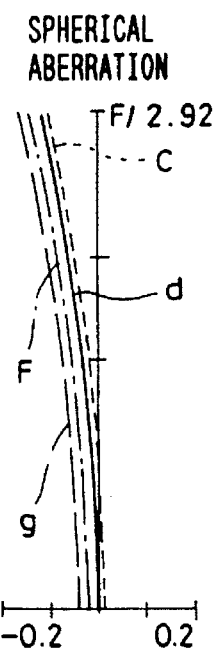
Figure 25B:
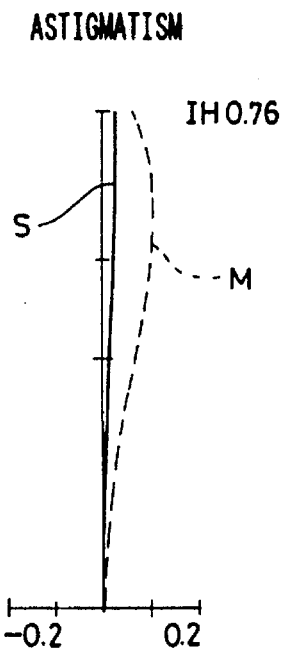
Figure 25C:
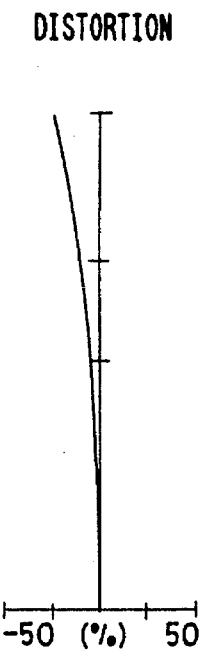
Figure 25D:
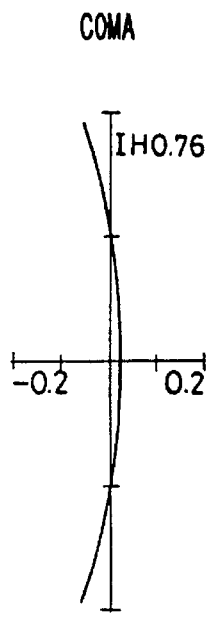
Figure 26A:
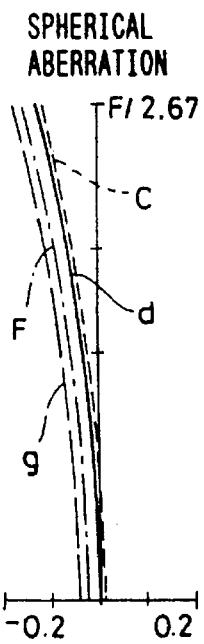
Figure 26B:
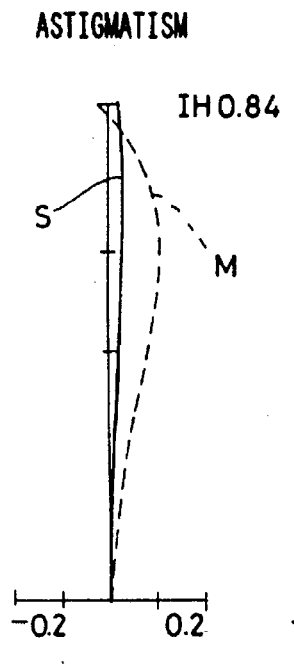
Figure 26C:
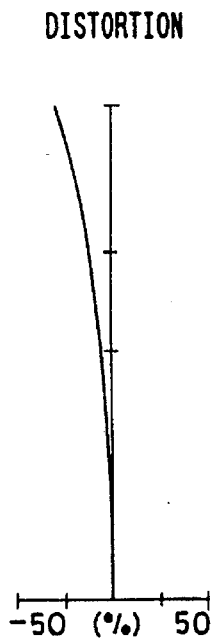
Figure 26D:
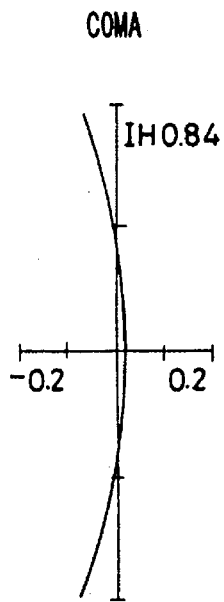
Figure 29A:
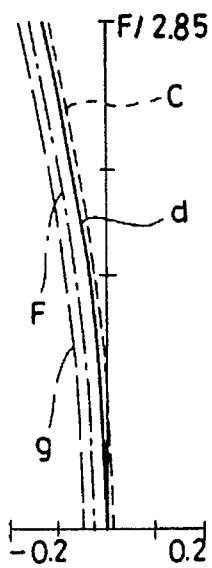
Figure 29B:
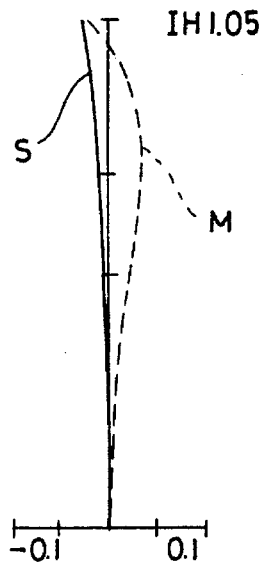
Figure 29C:
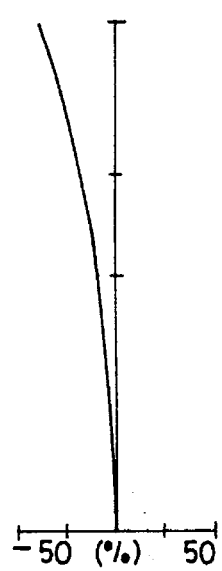
Figure 29D:
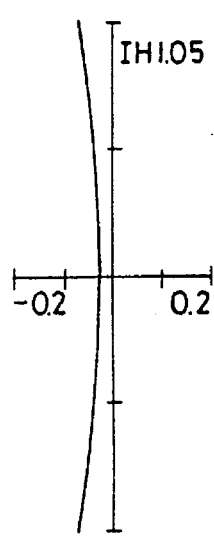
Figure 30A:
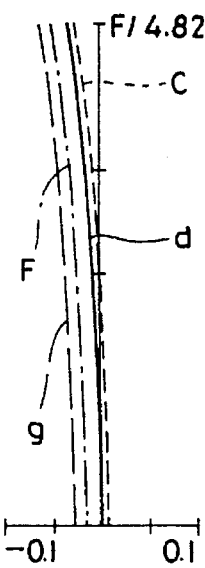
Figure 30B:
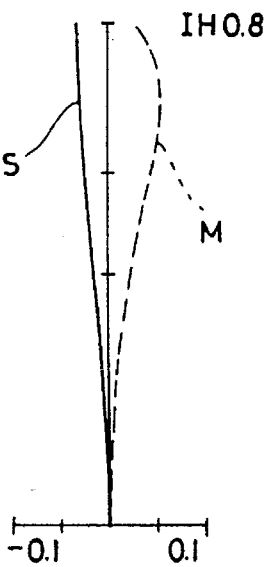
Figure 30C:
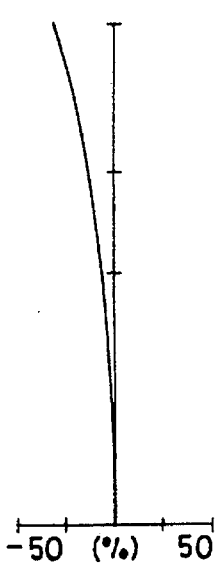
Figure 30D:
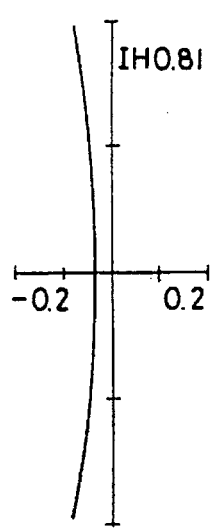
Figure 33A:
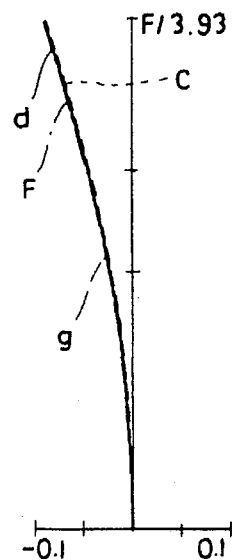
Figure 33B:
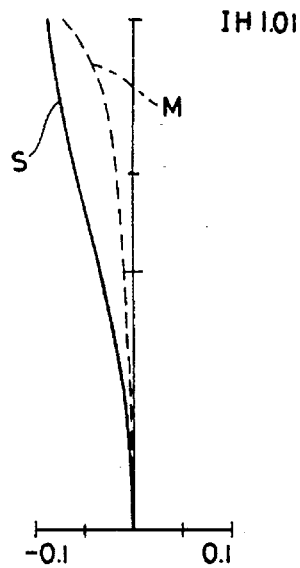
Figure 33C:
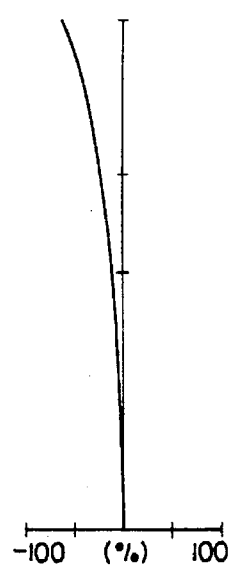
Figure 33D:
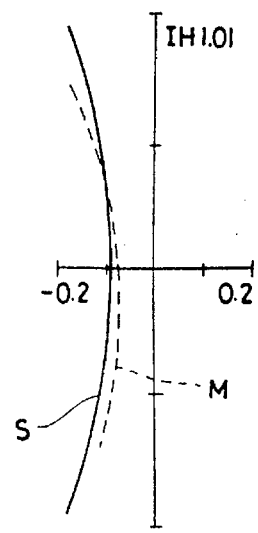
Figure 34A:
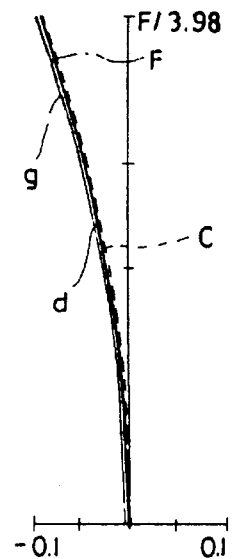
Figure 34B:
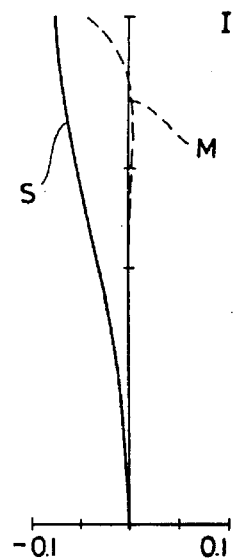
Figure 34C:
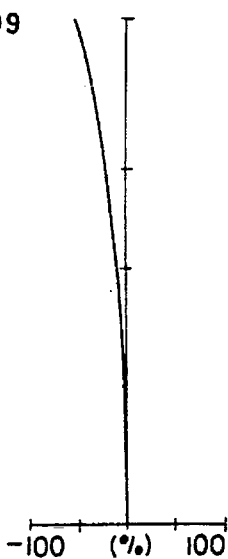
Figure 34D:
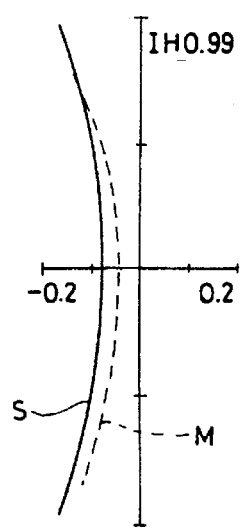
Figure 37A:
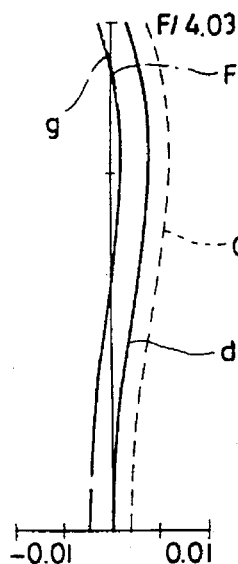
Figure 37B:
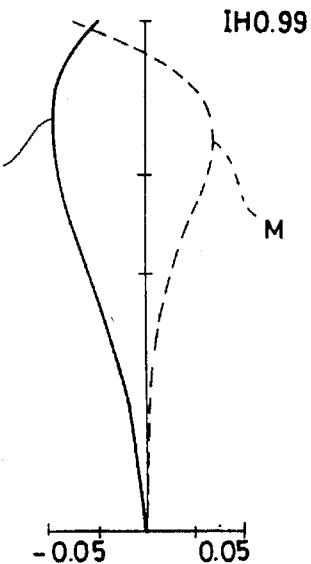
Figure 37C:
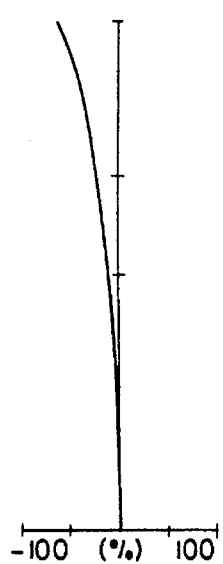
Figure 37D:
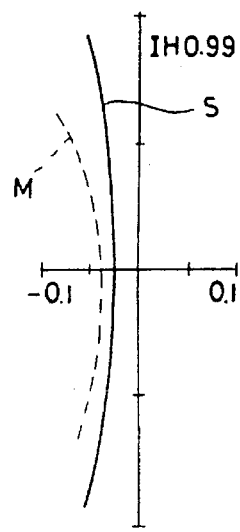
Figure 38A:
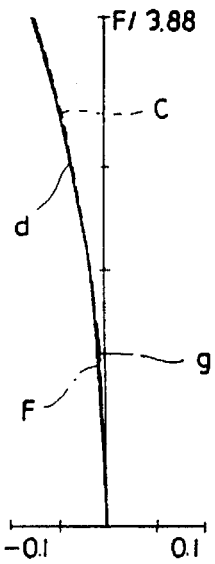
Figure 38B:
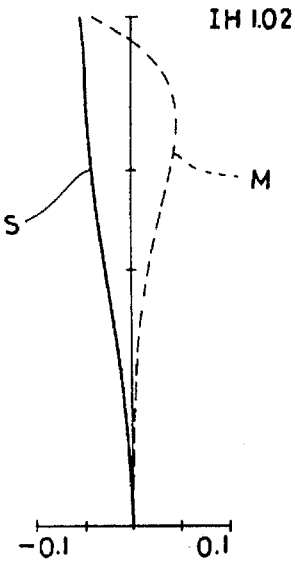
Figure 38C:
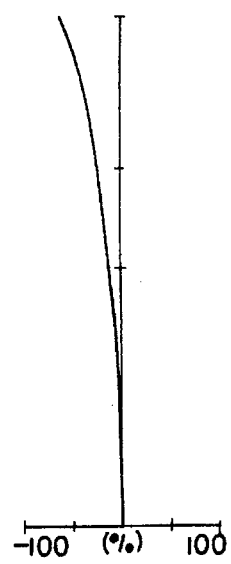
Figure 38D:
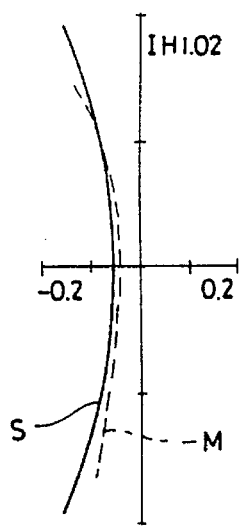

The twentieth embodiment is an objective optical system which has a composition illustrated in FIG. 21 and a wide field angle of 110° owing to a fact that a second lens element of the seocnd lens component has an image side surface configured as an aspherical surface. In the twentieth embodiment, spherical aberration and coma are also corrected favorably by configuring the image side surface of the second lens element as the aspherical surface while maintaining favorably corrected lateral chromatic aberration and longitudinal chromatic aberration.

The objective optical system for endoscopes according to the present invention is a wide angle lens system which is composed of a small number of lens components, and has favorably corrected curvature of field, lateral chromatic aberration and longitudinal chromatic aberration.

We claim:

1. An objective optical system for endoscopes consisting of, in order from an object side:

a front lens unit consisting of a single lens component having a negative refractive power;

an aperture stop; and a rear lens unit consisting of a single lens component having a positive refractive power;

wherein said objective optical system satisfies the following conditions:

$CJ < 8IH$ $D_2 < 2f$ wherein said reference symbol CJ represents a distance as measured from a first surface of said objective optical system to a paraxial image surface thereof, said reference symbol IH designates a maximum image height, said reference symbol $D_2$ represents a distance as measured from an image side surface of said negative single lens component to said aperture stop, and said reference symbol f designates a focal length of said objective optical system as a whole.

2. An objective optical system for endoscopes according to claim 1, wherein said single lens component of said rear lens unit consists of a single converging lens element.

3. An objective optical system for endoscopes according to claim 1, wherein said single lens component of said rear lens unit is a cemented lens component consisting of:

a diverging lens element having a concave surface on an image side; and a biconvex converging lens element.

4. An objective optical system for endoscopes according to claim 2, wherein an absolute value of a radius of curvature on an object side surface of said rear lens unit is larger than an absolute value of a radius of curvature on an image side surface of said rear lens unit.

5. An objective optical system for endoscopes according to claim 1, wherein said system satisfies the following condition:

$v_1 > 40$ wherein the reference symbol $v_1$ represents an Abbe's number of a lens component disposed on said object side of said objective optical system.

6. An objective optical system for endoscopes comprising, in order from an object side:

a front lens unit consisting of a single lens component having a negative refractive power;

an aperture stop; and a rear lens unit consisting of a single lens component having a positive refractive power;

wherein said objective optical system satisfies the following conditions:

CJ<8IH $D_2<2f$ wherein said reference symbol CJ represents a distance as measured from a first surface of said objective optical system to a paraxial image surface thereof and said reference symbol IH designates a maximum image height, said reference symbol $D_2$ represents a distance as measured from an image side surface of said negative single lens component to said aperture stop and said reference symbol f designates a focal length of said objective optical system as a whole; and wherein said front lens unit has a coating on a concave surface thereof which cuts off YAG laser light.

7. An objective optical system for endoscopes comprising, in order from an object side:

a front lens unit consisting of a single lens component having a negative refractive power;

an aperture stop; and a rear lens unit consisting of a single lens component having a positive refractive power;

wherein said objective optical system satisfies the following conditions:

CJ<8IH $D_2<2f$ where said reference symbol CJ represents a distance as measured from a first surface of said objective optical system to a paraxial image surface thereof and said reference symbol IH designates a maximum image height, said reference symbol $D_2$ represents a distance as measured an image side surface of said negative single lens component to said aperture stop and said reference symbol f designates a focal length of said objective optical system as a whole; and wherein said lens component of said rear lens unit is made of material which absorbs infrared light and is disposed immediately after said aperture stop.

8. An objective optical system for endoscopes according to claim 1, wherein said front lens unit has a convex surface on an object side thereof.

9. An objective optical system for endoscopes according to claim 2, wherein said system satisfies the following condition:

$0.3<|f_2/f_1|<2$ wherein said reference symbol $f_1$ represents a focal length of said front lens unit and said reference symbol $f_2$ designates a focal length of said rear lens unit.

10. An objective optical system for endoscopes according to claim 2, wherein said system satisfies the following condition:

$v_2>40$ wherein said reference symbol $v_2$ represents an Abbe's number of a lens component in said rear lens unit.

11. An objective optical system for endoscopes according to claim 3, wherein said system satisfies the following condition:

$v_{2d}<v_{3d}$ wherein said reference symbol $v_{2d}$ represents an Abbe's number of a first lens element of said rear lens unit and said reference symbol $v_{3d}$ designates an Abbe's number of a second lens element of said rear lens unit.

12. An objective optical system for endoscopes according to claim 3, wherein said system satisfies the following condition:

$v_{2d}<35$ wherein said reference symbol $v_{2d}$ represents an Abbe's number of a first lens element of said rear lens unit.

13. An objective optical system for endoscopes according to claim 11, comprising at least one aspherical surface.

14. An objective optical system for endoscopes according to claim 13, wherein said aspherical surface satisfies the following condition:

$E_i'(n_{i-1}-n_i)>0$ wherein said reference symbols $n_{i-1}$ and $n_i$ represent refractive indices of media located on an object side and an image side respectively of said aspherical surface, and said reference symbol $E_i'$ designates an aspherical surface coefficient of a fourth order of said aspherical surface.

15. An objective optical system for endoscopes according to claim 13, wherein said aspherical surface satisfies the following condition:

$\Delta x(h_m) \cdot (n_{i-1}-n_i)>0$ wherein said reference symbols $n_{i-1}$ and $n_i$ represent refractive indices of media located on an object side and an image side respectively of said aspherical surface, and said reference symbol $\Delta x(h_m)$ designates a departure of said aspherical surface from a reference sphere thereof as measured at a height of $h_m$ of a marginal ray on said aspherical surface.

16. An objective optical system for endoscopes according to any one of claims 14 or 15, wherein said aspherical surface is used as an image side surface of said rear lens unit.

17. An objective optical system for endoscopes comprising, from an object side:

a front lens unit consisting of a single lens component having a negative refractive power;

an aperture stop; and a rear lens unit consisting of a single lens component consisting of a single converging lens element having a positive refractive power;

wherein said objective optical system satisfies the following conditions:

CJ<8IH $D_2<2f$ wherein said reference symbol CJ represents a distance as measured from a first surface of said objective optical system to a paraxial image surface thereof and said reference symbol IH designates a maximum image height, said reference symbol $D_2$ represents a distance as measured from an image side surface of said negative single lens component to said aperture stop and said reference symbol f designates a focal length of said objective optical system as a whole;

wherein said rear lens unit has an image side surface configured as an aspherical surface and said aspherical surface satisfies the following conditions:

$E_i'(n_{i-1}-n_i)>0$ $F_i'(n_{i-1}-n_i)>0$ wherein said reference symbols $n_{i-1}$ and $n_i$ represent refractive indices of media located on an object side and an image side respectively of said aspherical surface, and said reference symbols $E_i'$ and $F_i'$ designate aspherical surface coefficients of a fourth order and a sixth order respectively of said aspherical surface.

18. An objective optical system for endoscopes comprising, in order from an object side:

a front lens unit consisting of a single lens component having a negative refractive power;

an aperture stop; and a rear lens unit consisting of a single lens component consisting of a single converging lens element having a positive refractive power;

wherein said object optical system satisfies the following conditions:

CJ<8IH $D_2<2f$ wherein said reference symbol CJ represents a distance as measured from a first surface of said objective optical system to a paraxial image surface thereof and said reference symbol IH designates a maximum image height, said reference symbol $D_2$ represents a distance as measured from an image side surface of said negative single lens component to said aperture stop and said reference symbol f designates a focal length of said objective optical system as a whole;

wherein said rear lens unit has an image side surface configured as an aspherical surface and said aspherical surface satisfies the following conditions:

$\Delta x(h_m)\cdot(n_{i-1}-n_i)>0$ $F_i'(n_{i-1}-n_i)>0$ wherein said reference symbols $n_{i-1}$ and $n_i$ represent refractive indices of media located on an object side and an image side respectively of said aspherical surface, said reference symbol $\Delta x(h_m)$ designates a departure of said aspherical surface from a reference sphere thereof as measured at a height of $h_m$ of a marginal ray on said aspherical surface and said reference symbol $F_i'$ denotes an aspherical surface coefficient of a sixth order of said aspherical surface.

19. An objective optical system for endoscopes consisting of two only single lens components and an aperture stop, one of said lens components having a negative refractive power and the other of said lens components having a positive refractive power;

said aperture stop being between said single lens components and said single lens component having said negative refractive power being closest to an object side of said system; and said objective optical system satisfying the following condition:

CJ<8IH $D_2<2f$ wherein said reference symbol CJ represents a distance as measured from a first surface of said objective optical system to a paraxial image surface thereof and said reference symbol IH designates a maximum image height, said reference symbol $D_2$ represents a distance as measured from an image side surface of said negative single lens component to said aperture stop, and said reference symbol f designates a focal length of said objective optical system as a whole.

20. An objective optical system for endoscopes comprising, in order from an object side:

a front lens unit consisting of a single lens component having a negative refractive power;

an aperture stop; and a rear lens unit consisting of a single lens component having a positive refractive power, an absolute value of a radius of curvature on an object side surface of said rear lens unit being larger than an absolute value of a radius of curvature on an image side surface of said rear lens unit, and said single lens component of said rear lens unit is a cemented lens component consisting of:

a diverging lens element having a concave surface on an image side, and a biconvex lens element;

said objective optical system satisfying the following conditions:

CJ<8IH $D_2<2f$ wherein said reference symbol CJ represents a distance as measured from a first surface of said objective optical system to a paraxial image surface thereof, said reference symbol IH designates a maximum image height, said reference symbol $D_2$ represents a distance as measured from an image side surface of said negative single lens component to said aperture stop, and said reference symbol f designates a focal length of said objective optical system as a whole.

* * * * *